(12) United States Patent
Molin

(10) Patent No.: US 9,187,367 B2
(45) Date of Patent: Nov. 17, 2015

(54) CURING APPARATUS EMPLOYING ANGLED UVLEDS

(75) Inventor: Denis Molin, Draveil (FR)

(73) Assignee: Draka Comteq, B.V., Amsterdam (NL)

( * ) Notice: Subject to any disclaimer, the term of this patent is extended or adjusted under 35 U.S.C. 154(b) by 490 days.

(21) Appl. No.: 13/111,147

(22) Filed: May 19, 2011

(65) Prior Publication Data
US 2011/0287195 A1 Nov. 24, 2011

Related U.S. Application Data

(60) Provisional application No. 61/346,806, filed on May 20, 2010, provisional application No. 61/351,151, filed on Jun. 3, 2010.

(51) Int. Cl.
B05D 7/20 (2006.01)
C03C 25/12 (2006.01)
C03C 25/62 (2006.01)
B05D 3/06 (2006.01)

(52) U.S. Cl.
CPC ............. C03C 25/12 (2013.01); C03C 25/6226 (2013.01); B05D 3/067 (2013.01); B05D 7/20 (2013.01)

(58) Field of Classification Search
USPC ............ 427/513, 558, 595; 118/642; 385/128
See application file for complete search history.

(56) References Cited

U.S. PATENT DOCUMENTS

| | | |
|---|---|---|
| 3,737,051 A | 6/1973 | Horino |
| 3,784,836 A | 1/1974 | Tolliver |
| 3,800,160 A | 3/1974 | Ishizawa et al. |
| 3,819,929 A | 6/1974 | Newman |
| 3,983,039 A | 9/1976 | Eastland |
| 4,010,374 A | 3/1977 | Ramler |
| 4,033,263 A | 7/1977 | Richmond |
| 4,070,499 A | 1/1978 | Ramier et al. |
| 4,145,136 A | 3/1979 | Takahashi |
| 4,309,452 A | 1/1982 | Sachs |
| 4,321,073 A | 3/1982 | Blair |
| 4,334,733 A | 6/1982 | Takeshima et al. |
| 4,479,984 A | 10/1984 | Levy et al. |
| 4,490,410 A | 12/1984 | Takiyama et al. |
| 4,518,628 A | 5/1985 | Biswas et al. |
| 4,591,724 A | 5/1986 | Fuse et al. |
| 4,636,405 A | 1/1987 | Mensah et al. |
| 4,683,525 A | 7/1987 | Camm |
| 4,710,638 A | 12/1987 | Wood |
| 4,761,168 A | 8/1988 | Blyler, Jr. et al. |
| 4,774,104 A | 9/1988 | Severijns et al. |
| 4,838,643 A | 6/1989 | Hodges et al. |
| 4,839,513 A | 6/1989 | Wijtsma |
| 4,844,604 A | 7/1989 | Bishop et al. |
| 4,853,021 A | 8/1989 | Soszka et al. |
| 4,910,107 A | 3/1990 | Kawanda et al. |
| 4,913,859 A | 4/1990 | Overton et al. |
| 4,962,992 A | 10/1990 | Chapin et al. |
| 4,980,701 A | 12/1990 | Contois et al. |
| 4,990,971 A | 2/1991 | Le Creff |
| 5,062,723 A | 11/1991 | Takeda et al. |
| 5,146,531 A | 9/1992 | Shustack |
| 5,208,645 A | 5/1993 | Inoue et al. |
| 5,219,623 A | 6/1993 | Petisce |
| 5,278,432 A | 1/1994 | Ignatius et al. |
| 5,278,482 A | 1/1994 | Bahn |
| 5,366,527 A | 11/1994 | Amos et al. |
| 5,405,657 A | 4/1995 | Bastian et al. |
| 5,418,369 A | 5/1995 | Moore et al. |
| 5,420,768 A | 5/1995 | Kennedy |
| 5,427,862 A | 6/1995 | Ngo et al. |
| 5,440,137 A | 8/1995 | Sowers |
| 5,440,660 A | 8/1995 | Dombrowski et al. |
| 5,535,673 A | 7/1996 | Bocko et al. |
| 5,574,816 A | 11/1996 | Yang et al. |
| 5,633,123 A | 5/1997 | Hill et al. |
| 5,634,711 A | 6/1997 | Kennedy et al. |
| 5,660,461 A | 8/1997 | Ignatius et al. |
| 5,712,487 A | 1/1998 | Adachi et al. |
| 5,717,805 A | 2/1998 | Stulpin |
| 5,731,112 A | 3/1998 | Lewis et al. |
| 5,733,607 A | 3/1998 | Mangum et al. |
| 5,756,165 A | 5/1998 | Ali et al. |
| 5,761,362 A | 6/1998 | Yang et al. |

(Continued)

FOREIGN PATENT DOCUMENTS

| | | |
|---|---|---|
| CN | 1396134 A | 2/2003 |
| DE | 2911410 A1 | 9/1980 |

(Continued)

OTHER PUBLICATIONS

Davidson,Michael. "Fundamentals of Light-Emitting Diodes" Zeiss Microscopy (2008), online at http://zeiss-campus.magnet.fsu.edu/print/lightsources/leds-print.html.*

(Continued)

Primary Examiner — Dah-Wei D. Yuan
Assistant Examiner — Jose Hernandez-Diaz
(74) Attorney, Agent, or Firm — Additon, Higgins & Pendleton, P.A.

(57) ABSTRACT

A UVLED apparatus (and related system and method) provide efficient curing of an optical-fiber coating on a drawn glass fiber. The apparatus employs one or more UVLEDs that emit electromagnetic radiation into a curing space. An incompletely cured optical-fiber coating, which is formed upon a glass fiber, absorbs emitted and reflected electromagnetic radiation to promote efficient curing.

23 Claims, 7 Drawing Sheets

(56) References Cited

U.S. PATENT DOCUMENTS

| | | |
|---|---|---|
| 5,761,367 A | 6/1998 | Matsumoto |
| 5,762,867 A | 6/1998 | D'Silva |
| 5,763,003 A | 6/1998 | Bonicel et al. |
| 5,764,263 A | 6/1998 | Lin |
| 5,840,451 A | 11/1998 | Moore et al. |
| 5,845,034 A | 12/1998 | Petisce |
| D404,045 S | 1/1999 | Mandellos |
| D404,046 S | 1/1999 | Mandellos |
| D404,409 S | 1/1999 | Mandellos |
| 5,857,767 A | 1/1999 | Hochstein |
| 5,885,652 A | 3/1999 | Abbott, III et al. |
| 5,911,023 A | 6/1999 | Risch et al. |
| 5,963,240 A | 10/1999 | Shinohara et al. |
| 5,973,331 A | 10/1999 | Stevens et al. |
| 5,982,968 A | 11/1999 | Stulpin |
| 5,986,682 A | 11/1999 | Itou |
| 5,990,498 A | 11/1999 | Chapnik et al. |
| 6,013,330 A | 1/2000 | Lutz |
| 6,018,605 A | 1/2000 | Mills et al. |
| 6,035,087 A | 3/2000 | Bonicel et al. |
| 6,066,397 A | 5/2000 | Risch et al. |
| 6,075,595 A | 6/2000 | Malinen |
| 6,085,009 A | 7/2000 | Risch et al. |
| 6,092,890 A | 7/2000 | Wen et al. |
| 6,112,037 A | 8/2000 | Nagata et al. |
| 6,118,130 A | 9/2000 | Barry |
| 6,134,363 A | 10/2000 | Hinson et al. |
| 6,145,979 A | 11/2000 | Caiger et al. |
| 6,163,036 A | 12/2000 | Taninaka et al. |
| 6,175,677 B1 | 1/2001 | Yang et al. |
| 6,181,857 B1 | 1/2001 | Emeterio et al. |
| 6,185,394 B1 | 2/2001 | Lee |
| 6,188,086 B1 | 2/2001 | Masuda et al. |
| 6,190,483 B1 | 2/2001 | Yang et al. |
| 6,200,134 B1 | 3/2001 | Kovac et al. |
| 6,210,802 B1 | 4/2001 | Risch et al. |
| 6,215,931 B1 | 4/2001 | Risch et al. |
| 6,287,672 B1 | 9/2001 | Fields et al. |
| 6,314,224 B1 | 11/2001 | Stevens et al. |
| 6,321,012 B1 | 11/2001 | Shen |
| 6,321,014 B1 | 11/2001 | Overton et al. |
| 6,331,111 B1 | 12/2001 | Cao |
| 6,333,509 B1 | 12/2001 | Lumpp |
| 6,334,016 B1 | 12/2001 | Greer, IV |
| 6,338,878 B1 | 1/2002 | Overton et al. |
| 6,345,149 B1 | 2/2002 | Ervin et al. |
| 6,354,700 B1 | 3/2002 | Roth |
| 6,376,568 B1 | 4/2002 | Baudin et al. |
| 6,381,390 B1 | 4/2002 | Hutton et al. |
| 6,425,663 B1 | 7/2002 | Eastlund et al. |
| 6,447,112 B1 | 9/2002 | Hu et al. |
| 6,457,823 B1 | 10/2002 | Cleary et al. |
| 6,463,872 B1 | 10/2002 | Thompson |
| 6,493,491 B1 | 12/2002 | Shen et al. |
| 6,498,355 B1 | 12/2002 | Harrah et al. |
| 6,501,084 B1 | 12/2002 | Sakai et al. |
| 6,517,218 B2 | 2/2003 | Hochstein |
| 6,523,948 B2 | 2/2003 | Matsumoto et al. |
| 6,525,752 B2 | 2/2003 | Vackier et al. |
| 6,528,955 B1 | 3/2003 | Powers et al. |
| 6,536,889 B1 | 3/2003 | Biegelsen et al. |
| 6,561,640 B1 | 5/2003 | Young |
| 6,579,495 B1 | 6/2003 | Maiden |
| 6,584,263 B2 | 6/2003 | Fewkes et al. |
| 6,589,716 B2 | 7/2003 | Sweatt et al. |
| 6,603,908 B2 | 8/2003 | Dallas et al. |
| 6,613,170 B1 | 9/2003 | Ohno et al. |
| 6,618,538 B2 | 9/2003 | Nechitailo et al. |
| 6,626,561 B2 | 9/2003 | Carter et al. |
| 6,630,286 B2 | 10/2003 | Kramer |
| 6,658,184 B2 | 12/2003 | Bourget et al. |
| 6,671,421 B1 | 12/2003 | Ogata et al. |
| 6,683,421 B1 | 1/2004 | Kennedy et al. |
| 6,720,566 B2 | 4/2004 | Blandford |
| 6,726,317 B2 | 4/2004 | Codos |
| 6,741,780 B2 | 5/2004 | Vanpoulle et al. |
| 6,749,446 B2 | 6/2004 | Nechitailo |
| 6,755,647 B2 | 6/2004 | Melikechi et al. |
| 6,768,839 B2 | 7/2004 | Blomquist et al. |
| 6,783,810 B2 | 8/2004 | Jin et al. |
| 6,807,906 B1 | 10/2004 | DeMoore et al. |
| 6,835,679 B2 | 12/2004 | Bilanin et al. |
| 6,877,248 B1 | 4/2005 | Cross et al. |
| 6,880,954 B2 | 4/2005 | Ollett et al. |
| 6,885,035 B2 | 4/2005 | Bhat et al. |
| 6,912,347 B2 | 6/2005 | Rossi et al. |
| 6,913,794 B2 | 7/2005 | Hoult et al. |
| 6,922,515 B2 | 7/2005 | Nechitailo et al. |
| 6,929,828 B2 | 8/2005 | Baudin et al. |
| 6,941,049 B2 | 9/2005 | Risch et al. |
| 6,949,591 B1 | 9/2005 | Allard et al. |
| 7,001,644 B2 | 2/2006 | Baudin et al. |
| 7,022,382 B1 | 4/2006 | Khudyakov et al. |
| 7,045,010 B2 | 5/2006 | Sturman, Jr. |
| 7,080,900 B2 | 7/2006 | Takabayashi et al. |
| 7,084,183 B2 | 8/2006 | Fuchs et al. |
| 7,137,696 B2 | 11/2006 | Siegel |
| 7,153,015 B2 | 12/2006 | Brukilacchio |
| 7,162,128 B2 | 1/2007 | Lovie et al. |
| 7,173,266 B2 | 2/2007 | Katsuki |
| 7,175,712 B2 | 2/2007 | Siegel |
| 7,211,299 B2 | 5/2007 | Siegel |
| 7,232,850 B2 | 6/2007 | Johnson et al. |
| 7,250,611 B2 | 7/2007 | Aguirre et al. |
| 7,322,122 B2 | 1/2008 | Overton et al. |
| 7,346,244 B2 | 3/2008 | Gowan et al. |
| 7,356,234 B2 | 4/2008 | de Montmorillon et al. |
| 7,399,982 B2 | 7/2008 | Siegel |
| 7,465,909 B2 | 12/2008 | Siegel |
| 7,470,921 B2 | 12/2008 | Custer |
| 7,483,613 B2 | 1/2009 | Bigot-Astruc et al. |
| 7,498,065 B2 | 3/2009 | Siegel |
| 7,515,795 B2 | 4/2009 | Overton et al. |
| 7,526,177 B2 | 4/2009 | Matthijsse et al. |
| 7,555,186 B2 | 6/2009 | Flammer et al. |
| 7,567,739 B2 | 7/2009 | Overton et al. |
| 7,570,852 B2 | 8/2009 | Nothofer et al. |
| 7,587,111 B2 | 9/2009 | de Montmorillon et al. |
| 7,599,589 B2 | 10/2009 | Overton et al. |
| 7,623,747 B2 | 11/2009 | de Montmorillon et al. |
| 7,639,915 B2 | 12/2009 | Parris et al. |
| 7,646,952 B2 | 1/2010 | Parris |
| 7,646,954 B2 | 1/2010 | Tatat |
| 7,671,346 B2 | 3/2010 | Siegel |
| 7,702,204 B2 | 4/2010 | Gonnet et al. |
| 7,724,998 B2 | 5/2010 | Parris et al. |
| 7,775,690 B2 | 8/2010 | Wakalopulos |
| 7,817,891 B2 | 10/2010 | Lavenne et al. |
| 7,842,932 B2 | 11/2010 | Knight et al. |
| 7,847,269 B2 | 12/2010 | Cekic et al. |
| 7,889,960 B2 | 2/2011 | de Montmorillon et al. |
| 7,923,706 B2 | 4/2011 | Brassell et al. |
| 7,970,247 B2 | 6/2011 | Barker |
| 7,974,507 B2 | 7/2011 | Lovie et al. |
| 8,314,408 B2 | 11/2012 | Hartsuiker et al. |
| 2001/0030866 A1 | 10/2001 | Hochstein |
| 2001/0032985 A1 | 10/2001 | Bhat et al. |
| 2001/0033725 A1* | 10/2001 | Szum et al. ............... 385/128 |
| 2001/0046652 A1 | 11/2001 | Ostler et al. |
| 2001/0048814 A1 | 12/2001 | Lenmann et al. |
| 2001/0050344 A1 | 12/2001 | Albou |
| 2001/0052920 A1 | 12/2001 | Matsumoto et al. |
| 2002/0015234 A1 | 2/2002 | Suzuki et al. |
| 2002/0016378 A1 | 2/2002 | Jin et al. |
| 2002/0044188 A1 | 4/2002 | Codos |
| 2002/0050575 A1 | 5/2002 | Keogh et al. |
| 2002/0074554 A1 | 6/2002 | Sweatt et al. |
| 2002/0074559 A1 | 6/2002 | Dowling et al. |
| 2002/0149660 A1 | 10/2002 | Cleary et al. |
| 2002/0172913 A1 | 11/2002 | Cao |
| 2002/0175299 A1 | 11/2002 | Kanie et al. |
| 2003/0026919 A1 | 2/2003 | Kojima et al. |
| 2003/0035037 A1 | 2/2003 | Mills et al. |
| 2003/0109599 A1 | 6/2003 | Kamen |

(56) References Cited

U.S. PATENT DOCUMENTS

| | | |
|---|---|---|
| 2003/0218880 A1 | 11/2003 | Brukilacchio |
| 2003/0222961 A1 | 12/2003 | Nakajima |
| 2004/0011457 A1 | 1/2004 | Kobayashi et al. |
| 2004/0033317 A1 | 2/2004 | Baudin et al. |
| 2004/0036188 A1 | 2/2004 | Arboix et al. |
| 2004/0067037 A1 | 4/2004 | Tausch et al. |
| 2004/0075065 A1 | 4/2004 | Spivak |
| 2004/0090794 A1 | 5/2004 | Ollett et al. |
| 2004/0114016 A1 | 6/2004 | Yokoyama |
| 2004/0134603 A1 | 7/2004 | Kobayashi et al. |
| 2004/0135159 A1 | 7/2004 | Siegel |
| 2004/0152038 A1 | 8/2004 | Kumagai et al. |
| 2004/0156130 A1 | 8/2004 | Powell et al. |
| 2004/0164325 A1 | 8/2004 | Siegel |
| 2004/0166249 A1 | 8/2004 | Siegel |
| 2004/0189773 A1 | 9/2004 | Masumi |
| 2004/0238111 A1 | 12/2004 | Siegel |
| 2005/0042390 A1 | 2/2005 | Siegel |
| 2005/0051741 A1 | 3/2005 | Hallett et al. |
| 2005/0099478 A1 | 5/2005 | Iwase |
| 2005/0104946 A1 | 5/2005 | Siegel |
| 2005/0115498 A1 | 6/2005 | Ingram et al. |
| 2005/0116176 A1 | 6/2005 | Aguirre et al. |
| 2005/0152146 A1 | 7/2005 | Owen et al. |
| 2005/0222295 A1 | 10/2005 | Siegel |
| 2005/0228062 A1 | 10/2005 | Wolf et al. |
| 2005/0234145 A1 | 10/2005 | Sitzmann et al. |
| 2006/0007290 A1 | 1/2006 | Oshima et al. |
| 2006/0121208 A1 | 6/2006 | Siegel |
| 2006/0127594 A1 | 6/2006 | Siegel |
| 2006/0192829 A1 | 8/2006 | Mills et al. |
| 2006/0204670 A1 | 9/2006 | Siegel |
| 2006/0216193 A1 | 9/2006 | Johnson et al. |
| 2006/0230969 A1 | 10/2006 | Vosahlo |
| 2006/0233501 A1 | 10/2006 | Sampson |
| 2006/0237658 A1 | 10/2006 | Waluszko |
| 2006/0241259 A1 | 10/2006 | Tanabe et al. |
| 2006/0245187 A1 | 11/2006 | Scott et al. |
| 2006/0263921 A1 | 11/2006 | Nakamura et al. |
| 2006/0266955 A1 | 11/2006 | Arvin et al. |
| 2006/0270748 A1 | 11/2006 | Sommerlade et al. |
| 2006/0274421 A1 | 12/2006 | Okamitsu et al. |
| 2007/0241478 A1 | 10/2007 | Buckley |
| 2007/0286963 A1 | 12/2007 | Rocha-Alvarez et al. |
| 2008/0021126 A1 | 1/2008 | Dietliker et al. |
| 2008/0096115 A1 | 4/2008 | Tanabe et al. |
| 2008/0160211 A1 | 7/2008 | Siegel |
| 2008/0226272 A1 | 9/2008 | Kasai et al. |
| 2008/0290301 A1 | 11/2008 | Gardner |
| 2008/0292262 A1 | 11/2008 | Overton et al. |
| 2009/0032740 A1 | 2/2009 | Smith et al. |
| 2009/0065715 A1 | 3/2009 | Wainright |
| 2009/0127480 A1 | 5/2009 | Briggs et al. |
| 2009/0160923 A1 | 6/2009 | Custer |
| 2009/0175583 A1 | 7/2009 | Overton |
| 2009/0190349 A1 | 7/2009 | Middlemass et al. |
| 2009/0214167 A1 | 8/2009 | Lookadoo et al. |
| 2009/0218960 A1 | 9/2009 | Lyons et al. |
| 2009/0252469 A1 | 10/2009 | Sillard et al. |
| 2009/0279833 A1 | 11/2009 | Overton et al. |
| 2009/0279835 A1 | 11/2009 | de Montmorillon et al. |
| 2009/0279836 A1 | 11/2009 | de Montmorillon et al. |
| 2009/0297107 A1 | 12/2009 | Tatat |
| 2009/0321666 A1 | 12/2009 | Hilgers |
| 2010/0021170 A1 | 1/2010 | Lumineau et al. |
| 2010/0028020 A1 | 2/2010 | Gholami et al. |
| 2010/0067855 A1 | 3/2010 | Barker |
| 2010/0067857 A1 | 3/2010 | Lovie et al. |
| 2010/0092135 A1 | 4/2010 | Barker et al. |
| 2010/0092138 A1 | 4/2010 | Overton |
| 2010/0092139 A1 | 4/2010 | Overton |
| 2010/0092140 A1 | 4/2010 | Overton |
| 2010/0096564 A1 | 4/2010 | Yang et al. |
| 2010/0118388 A1 | 5/2010 | Pastouret et al. |
| 2010/0119202 A1 | 5/2010 | Overton |
| 2010/0135623 A1 | 6/2010 | Overton |
| 2010/0135624 A1 | 6/2010 | Overton et al. |
| 2010/0135625 A1 | 6/2010 | Overton |
| 2010/0135627 A1 | 6/2010 | Pastouret et al. |
| 2010/0142033 A1 | 6/2010 | Regnier et al. |
| 2010/0142969 A1 | 6/2010 | Gholami et al. |
| 2010/0150505 A1 | 6/2010 | Testu et al. |
| 2010/0154479 A1 | 6/2010 | Milicevic et al. |
| 2010/0166375 A1 | 7/2010 | Parris |
| 2010/0171945 A1 | 7/2010 | Gholami et al. |
| 2010/0183821 A1 | 7/2010 | Hartsuiker et al. |
| 2010/0189397 A1 | 7/2010 | Richard et al. |
| 2010/0189399 A1 | 7/2010 | Sillard et al. |
| 2010/0189400 A1 | 7/2010 | Sillard et al. |
| 2010/0202741 A1 | 8/2010 | Ryan et al. |
| 2010/0214649 A1 | 8/2010 | Burov et al. |
| 2010/0215328 A1 | 8/2010 | Tatat et al. |
| 2010/0223803 A1* | 9/2010 | Karlicek et al. ............... 34/275 |
| 2010/0242299 A1 | 9/2010 | Siegel |
| 2010/0254653 A1 | 10/2010 | Molin et al. |
| 2010/0310218 A1 | 12/2010 | Molin et al. |
| 2011/0026889 A1 | 2/2011 | Risch et al. |
| 2011/0044595 A1 | 2/2011 | Sillard et al. |
| 2011/0058781 A1 | 3/2011 | Molin et al. |
| 2011/0064367 A1 | 3/2011 | Molin et al. |
| 2011/0064371 A1 | 3/2011 | Leatherman et al. |
| 2011/0069724 A1 | 3/2011 | Richard et al. |
| 2011/0069932 A1 | 3/2011 | Overton et al. |
| 2011/0091171 A1 | 4/2011 | Tatat et al. |
| 2011/0116160 A1 | 5/2011 | Boivin et al. |
| 2011/0123161 A1 | 5/2011 | Molin et al. |
| 2011/0123162 A1 | 5/2011 | Molin et al. |
| 2011/0135262 A1 | 6/2011 | Molin et al. |
| 2011/0135263 A1 | 6/2011 | Molin et al. |
| 2011/0176782 A1 | 7/2011 | Parris |
| 2011/0188823 A1 | 8/2011 | Sillard et al. |
| 2011/0188826 A1 | 8/2011 | Sillard et al. |
| 2011/0217012 A1 | 9/2011 | Bigot-Astruc et al. |
| 2011/0229101 A1 | 9/2011 | de Montmorillon et al. |
| 2011/0268398 A1 | 11/2011 | Quinn et al. |
| 2011/0268400 A1 | 11/2011 | Lovie et al. |
| 2011/0287195 A1 | 11/2011 | Molin |
| 2012/0009358 A1 | 1/2012 | Gharbi et al. |
| 2012/0014652 A1 | 1/2012 | Parris |
| 2012/0040105 A1 | 2/2012 | Overton |
| 2013/0052364 A1 | 2/2013 | Hartsuiker et al. |
| 2013/0068969 A1 | 3/2013 | Childers |

FOREIGN PATENT DOCUMENTS

| | | |
|---|---|---|
| DE | 4226344 A1 | 2/1994 |
| DE | 102004008812 A | 9/2005 |
| EP | 0228896 A1 | 8/1987 |
| EP | 0854022 A1 | 7/1998 |
| EP | 1139439 A1 | 10/2001 |
| EP | 1138642 B1 | 7/2004 |
| EP | 1250297 B1 | 10/2005 |
| EP | 1764220 A1 | 3/2007 |
| EP | 1599340 B1 | 9/2007 |
| EP | 1861234 A2 | 12/2007 |
| EP | 1921478 A1 | 5/2008 |
| EP | 2085801 A1 | 8/2009 |
| EP | 2388239 A1 | 11/2011 |
| EP | 2418183 A1 | 2/2012 |
| GB | 2166975 A | 5/1986 |
| GB | 2350321 A | 11/2000 |
| GB | 2390332 A | 1/2004 |
| GB | 2396331 A | 6/2004 |
| JP | 60-126830 A | 7/1985 |
| JP | 61-010440 A | 1/1986 |
| JP | 62-026876 A | 2/1987 |
| JP | 63-182528 A | 7/1988 |
| JP | 1-107865 A | 4/1989 |
| JP | 1-124324 A | 5/1989 |
| JP | 5-213636 A | 8/1993 |
| JP | 5-323462 A | 12/1993 |
| JP | 2000-268416 B | 9/2000 |
| JP | 2001-209980 B | 8/2001 |
| JP | 2002-248803 A | 9/2002 |

(56) References Cited

FOREIGN PATENT DOCUMENTS

| | | |
|---|---|---|
| JP | 2003-029099 A | 1/2003 |
| JP | 2003-034557 A | 2/2003 |
| JP | 2003-034558 A | 2/2003 |
| JP | 2003-089555 A | 3/2003 |
| JP | 2005-129662 B | 5/2005 |
| JP | 2010-117526 A | 5/2010 |
| JP | 2010-117527 A | 5/2010 |
| WO | 01/11426 A1 | 2/2001 |
| WO | 02/093265 A1 | 11/2002 |
| WO | 03/096387 A2 | 11/2003 |
| WO | 2004/002746 A1 | 1/2004 |
| WO | 2004/011848 A2 | 2/2004 |
| WO | 2004/081475 A2 | 9/2004 |
| WO | 2005/068509 A1 | 7/2005 |
| WO | 2005/068510 A1 | 7/2005 |
| WO | 2005/100408 A1 | 10/2005 |
| WO | WO 2005082548 A3 * | 12/2005 |
| WO | 2006/096061 A1 | 9/2006 |
| WO | 2006/101519 A3 | 9/2006 |
| WO | 2006/101526 A3 | 9/2006 |
| WO | 2008/040650 A2 | 4/2008 |
| WO | 2009/062131 A1 | 5/2009 |
| WO | 2010/077132 A1 | 7/2010 |

OTHER PUBLICATIONS

Moreno et al. Modeling the radiation pattern of LEDs. Optics Express vol. 16, No. 3, 2008. pp. 1808-1819.*
Machine Translation of Jung et al. WO 2005/08258.*
Overton, U.S. Appl. No. 61/372,312, "Method and Apparatus Providing Increased UVLED Intensity", filed Aug. 10, 2010, pp. 1-74.
Overton, U.S. Appl. No. 61/112,595, "Microbend Resistant Optical Fiber", filed Nov. 7, 2008, pp. 1-271.
Dutch Search Report in counterpart Dutch Application No. 2004758 dated Jan. 3, 2011, pp. 1-5.
European Search Report in counterpart European Application No. 11166297 dated Sep. 13, 2011, pp. 1-5.
U.S. Appl. No. 60/986,737 for a Microbend Resistant Optical Fiber, filed Nov. 9, 2007, (Overton).
U.S. Appl. No. 61/041,484 for a Microbend Resistant Optical Fiber, filed Apr. 1, 2008, (Overton).
Dake, et al., "LED Curing Versus Conventional UV Curing Systems: Property Comparisons of Acrylates and Epoxies", DSM Desotech, USA, pp. 1-6.
CIBA, "Photoinitiators for UV Curing," Key Products Selection Guide 2003, Switzerland, pp. 1-8.
Bigot-Astruc et al., U.S. Appl. No. 13/175,181, "Single-Mode Optical Fiber", filed Jul. 1, 2011, pp. 1-74.
CIBA, "Photoinitiators for UV Curing," Formulators' Guide for Coatings, Additives, Switzerland, downloaded from www.mufon.com.tw/Ciba/ciba_guid/photo_uv_2.pdf on May 30, 2012, pp. 1-16.
Office Action in counterpart Chinese Application No. 201110132219.3 date Jul. 11, 2014, pp. 1-12 [European Pub. No. 0854022 and U.S. Pub. No. 2002/0050575 previously cited].

* cited by examiner

CURING APPARATUS EMPLOYING ANGLED UVLEDS

CROSS-REFERENCE TO PRIORITY APPLICATIONS

This U.S. nonprovisional application claims the benefit of U.S. Patent Application No. 61/346,806 for a Curing Apparatus Employing Angled UVLEDs (filed May 20, 2010) and U.S. Patent Application No. 61/351,151 for a Curing Apparatus Employing Angled UVLEDs (filed Jun. 3, 2010), each of which is hereby incorporated by reference in its entirety.

FIELD OF THE INVENTION

The present invention embraces an apparatus, a system, and a method for curing coatings on drawn glass fibers.

BACKGROUND

Glass fibers are typically protected from external forces with one or more coating layers. Typically, two or more layers of coatings are applied during the optical-fiber drawing process (i.e., whereby a glass fiber is drawn from an optical preform in a drawing tower). A softer inner coating layer typically helps to protect the glass fiber from microbending. A harder outer coating layer typically is used to provide additional protection and to facilitate handling of the glass fiber. The coating layers may be cured, for example, using heat or ultraviolet (UV) light.

UV curing requires that the coated glass fiber be exposed to high intensity UV radiation. Curing time can be reduced by exposing the coating to higher intensity UV radiation. Reducing curing time is particularly desirable to permit an increase in fiber drawing line speeds and thus optical-fiber production rates.

Mercury lamps (e.g., high pressure mercury lamps or mercury xenon lamps) are commonly used to generate the UV radiation needed for UV curing. One downside of using mercury lamps is that mercury lamps require a significant amount of power to generate sufficiently intense UV radiation. For example, UV lamps used to cure a single coated fiber (i.e., one polymeric coating) may require a collective power consumption of 50 kilowatts.

Another shortcoming of mercury lamps is that much of the energy used for powering mercury lamps is emitted not as UV radiation but rather as heat. Accordingly, mercury lamps must be cooled (e.g., using a heat exchanger) to prevent overheating. In addition, the undesirable heat generated by the mercury lamps may slow the rate at which the optical-fiber coatings cure.

Furthermore, mercury lamps generate a wide spectrum of electromagnetic radiation, such as having wavelengths of less than 200 nanometers and greater than 700 nanometers (i.e., infrared light). Typically, UV radiation having wavelengths of between about 300 nanometers and 400 nanometers is useful for curing UV coatings. Thus, much of the electromagnetic radiation generated by mercury bulbs is wasted (e.g., 90 percent or more). Additionally, glass fibers typically possess a diameter of about 125 microns or less, which, of course, is much smaller than the mercury bulbs. Consequently, most of the UV radiation emitted by the mercury lamps does not reach the glass fiber's uncured coating (i.e., the energy is wasted).

It may thus be advantageous to employ, as an alternative to conventional mercury lamps, UVLEDs to cure glass-fiber coatings. UVLEDs typically require significantly less energy and correspondingly generate much less heat energy than conventional UV lamps.

By way of example, U.S. Pat. No. 7,022,382 (Khudyakov et al.), which is hereby incorporated by reference in its entirety, discloses the use of UV lasers (e.g., continuous or pulsed lasers) for curing optical-fiber coatings.

U.S. Patent Application Publication No. 2003/0026919 (Kojima et al.), which is hereby incorporated by reference in its entirety, discloses the use of ultraviolet light emitting diodes (UVLEDs) for curing optical-fiber coatings. The disclosed optical-fiber resin coating apparatus includes a mold assembly in which a UV curable resin is coated onto an optical fiber. Also at the mold assembly, the coated optical fiber is exposed to UV radiation from a number of UVLEDs to cure the UV coating. A control circuit may be used to control the UV radiation output from the UVLED array. For example, the control circuit may reduce the current to one or more UVLEDs to reduce the intensity of emitted UV radiation. The control circuit may also be used to vary the intensity of the UV radiation as the optical fiber progresses through the mold assembly.

Even so, UVLEDs, though more efficient than mercury lamps, still waste a significant amount of energy in curing glass-fiber coatings. In particular, much of the emitted UV radiation is not used to cure the glass-fiber coatings.

Therefore, a need exists for a UVLED apparatus that, as compared with a conventional mercury-lamp device, not only consumes less power and generates less unwanted heat but also is capable of curing glass-fiber coatings with improved curing efficiency.

SUMMARY

Accordingly, the present invention embraces a UVLED apparatus (and associated systems and methods) for in situ curing of optical-fiber coating. The apparatus employs at least one UVLED source, such as a single UVLED or a plurality of discrete UVLEDs, that emits electromagnetic radiation into a curing space. An incompletely cured, coated glass fiber passes through the curing space, thereby absorbing electromagnetic radiation to effect curing of the optical-fiber coating.

An exemplary UVLED apparatus includes one or more UVLED sources positioned within a substantially cylindrical cavity. Each UVLED source typically has an emission pattern that defines a line of average emission $L_{avg}$. The cylindrical cavity has a reflective inner surface and an elliptical cross-section. Accordingly, the cavity defines a first line focus, a second line focus, and a major axis intersecting the first and second line foci. The UVLED source is typically positioned along the first line focus such that an emission angle α between the major axis and $L_{avg}$ is between about 30 degrees and 120 degrees (e.g., between about 30 degrees and 60 degrees). A glass fiber having an incompletely cured coating is passed through the cylindrical cavity along the second line focus to effect the absorption of UV radiation emitted by the UVLED source and reflected by the reflective inner surface of the cylindrical cavity.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1:
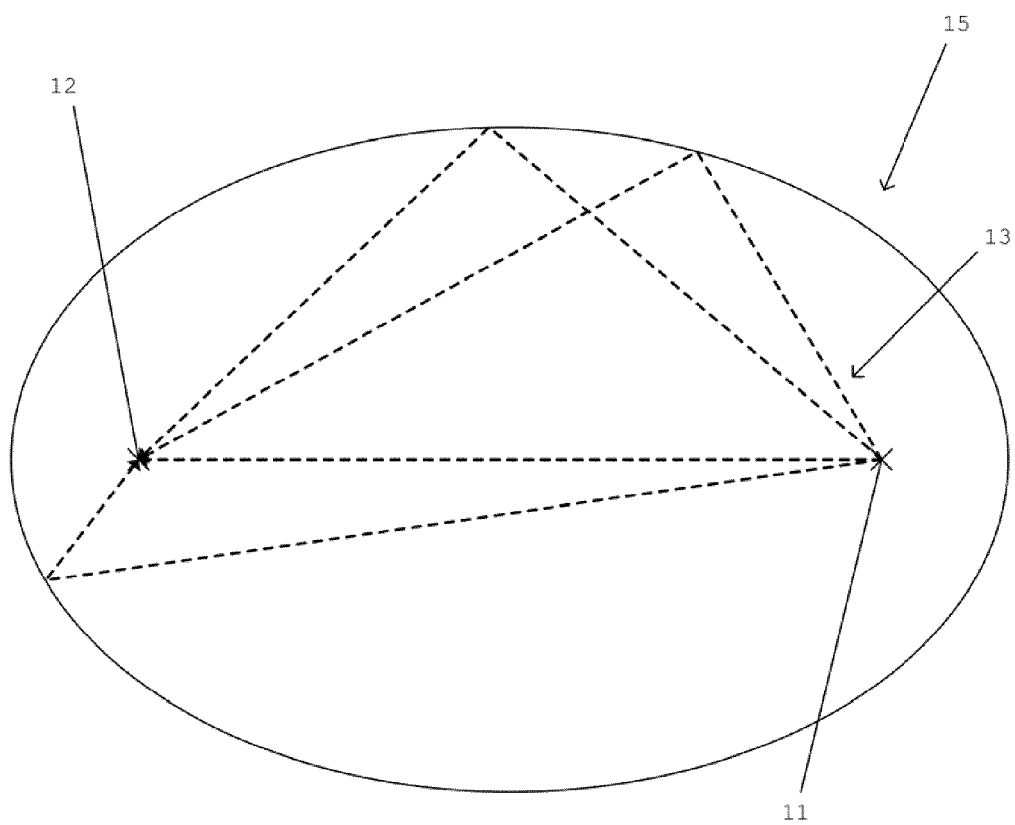
FIG. 1 schematically depicts a cross-sectional view of an elliptic cylinder having a reflective inner surface.

In one aspect, the present invention embraces an apparatus for curing glass-fiber coatings (e.g., primary coatings, secondary coatings, and/or tertiary ink layers). The apparatus typically employs a UVLED source that is oriented at an emission angle of more than 0 degrees relative to the glass fiber.

In a particular embodiment, the apparatus for curing glass-fiber coatings includes a UVLED source, such as one or more ultraviolet light emitting diodes (UVLEDs), positioned within a cylindrical cavity (or a substantially cylindrical cavity) that has a reflective inner surface. To achieve the reflective inner surface, the cylindrical cavity may be made from stainless steel or metalized glass, such as silvered quartz, or other suitable material. In addition, the interior of the cylindrical cavity defines a curing space. In turn, the curing space defines a curing axis along which a drawn glass fiber passes during the curing process.

Typically, a protective tube surrounds the curing axis. By way of example, a transparent quartz tube (e.g., a quartz tube that is substantially transparent to UV radiation emitted by the UVLEDs) having a diameter of about 24 millimeters and a thickness of about 2 millimeters may be employed as a protective tube. In another embodiment, the protective tube (e.g., a transparent quartz tube) may have a diameter of about 10 millimeters and a thickness of about 1 millimeter. In general, it is thought that employing a smaller protective tube would improve curing efficiency (i.e., reduce UV radiation waste).

The protective tube prevents curing byproducts from damaging and/or fouling the UVLEDs within the cylindrical cavity. In this regard, volatile components of the optical-fiber coating have a tendency to evaporate during curing. In the absence of a protective tube, these curing byproducts can precipitate onto both the UVLEDs and the cavity's reflective inner surface. The protective tube can also prevent uncured coating (e.g., delivered by a coating applicator) from being inadvertently deposited within the cylindrical cavity (e.g., spilled onto the UVLEDs and/or the cavity's reflective inner surface).

An inert gas (e.g., nitrogen) or gas mixture (e.g., nitrogen and oxygen) may be introduced into the protective tube to provide an oxygen-free or a reduced-oxygen environment around an optical fiber as its coating is being cured. In this regard, it has been observed that having a small amount of oxygen may promote efficient curing. Accordingly, the protective tube may provide an environment having between about 0.1 percent and 5 percent oxygen, such as between about 0.2 percent and 3 percent oxygen (e.g., about 0.31 percent oxygen). Providing a reduced-oxygen environment around the coated glass fiber seems to help reduce the consumption of free radicals by the oxygen.

Furthermore, the gas (e.g., nitrogen and/or oxygen) flowing through the protective tube may be heated, such as by employing one or more heat rings positioned around (i) the protective tube and/or (ii) a pipe supplying the gas. Alternatively, the gas flowing through the protective tube may be heated using infrared heaters. Heating the gas flow helps to remove unreacted coating components (e.g., coating monomers) and/or unwanted byproducts present in the cured coating.

In a typical embodiment, the cylindrical cavity has a non-circular elliptical cross-section. In other words, the cylindrical cavity usually has the shape of an elliptic cylinder. By way of illustration, an exemplary elliptic cylinder has a major axis length of 54 millimeters and a minor axis length of 45.8 millimeters. For an elliptic cylinder, the curing axis corresponds with one of the two line foci defined by the elliptic cylinder. Moreover, it is thought that the cylinder's elliptical shape can be modified to compensate for the deleterious effects that may be caused by the protective tube (e.g., refraction and reflection).

It will be appreciated by those having ordinary skill in the art that a UVLED does not emit UV radiation only toward a point or line, but rather emits UV radiation in many directions. Thus, most of the UV radiation emitted by a UVLED will not directly strike a glass-fiber coating to effect curing. In curing an optical-fiber coating, however, it is desirable that as much UV radiation as possible strike the optical fiber (i.e., a coated glass fiber). As will be understood by those having ordinary skill in the art, curing occurs when UV radiation is absorbed by photoinitiators in the glass-fiber coating.

Accordingly, the reflective surface of the cylindrical cavity can reflect otherwise misdirected UV radiation onto an optical fiber for curing, thus reducing wasted energy. Moreover, for a cylindrical cavity having an elliptical cross-section, any electromagnetic radiation that is emitted from one line focus (regardless of direction) will be directed toward the other line focus after being reflected at the inner surface of the cylinder. This principle is illustrated in FIG. 1, which schematically depicts a cross-sectional view of a reflective elliptic cylinder 15 having a first line focus 11 and a second line focus 12. As depicted in FIG. 1, each UV ray 13 emitted from the first line focus 11 will intersect the second line focus 12.

Figure 2:
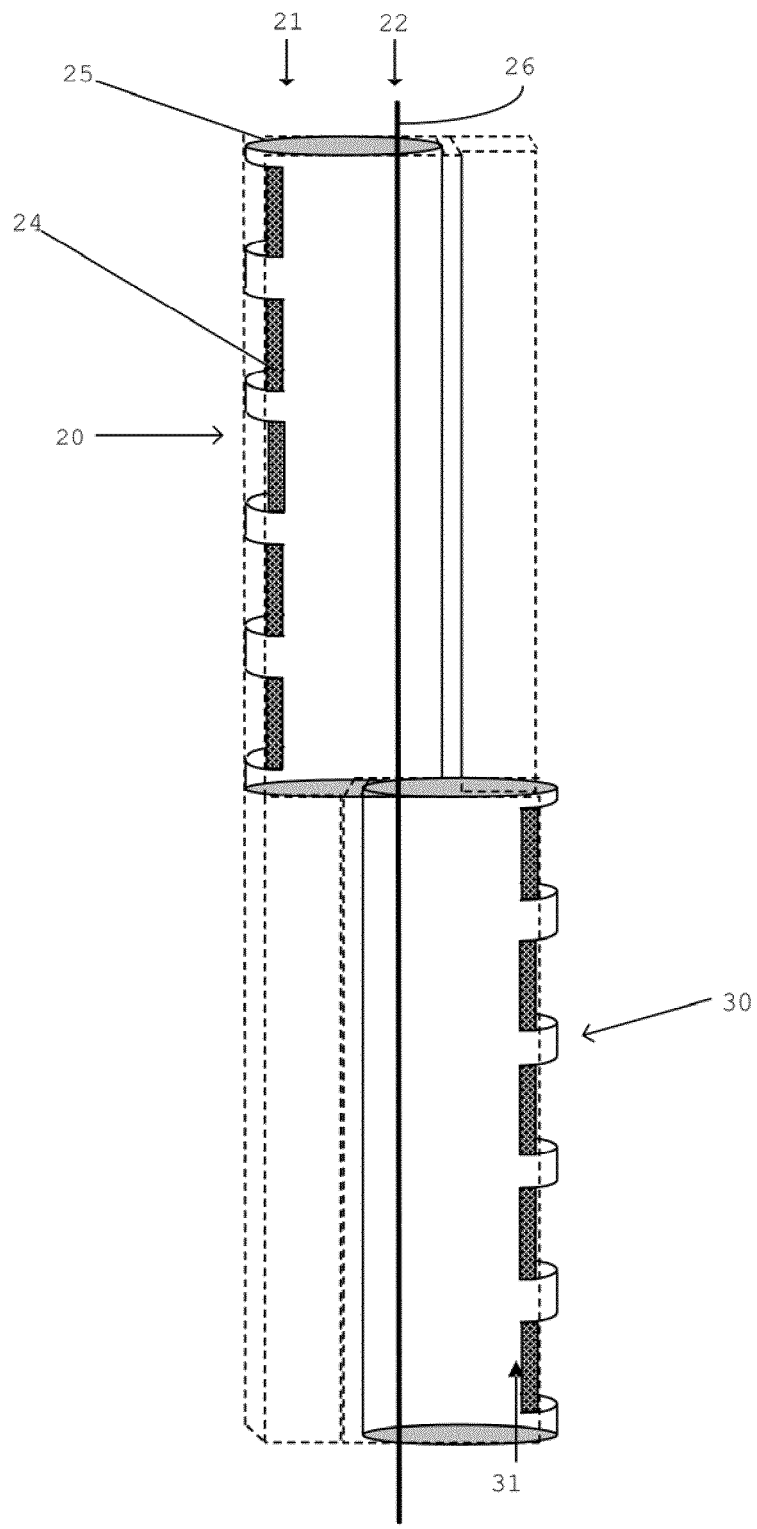
FIG. 2 schematically depicts a perspective view of an exemplary apparatus for curing a coated glass fiber.
Figure 3:
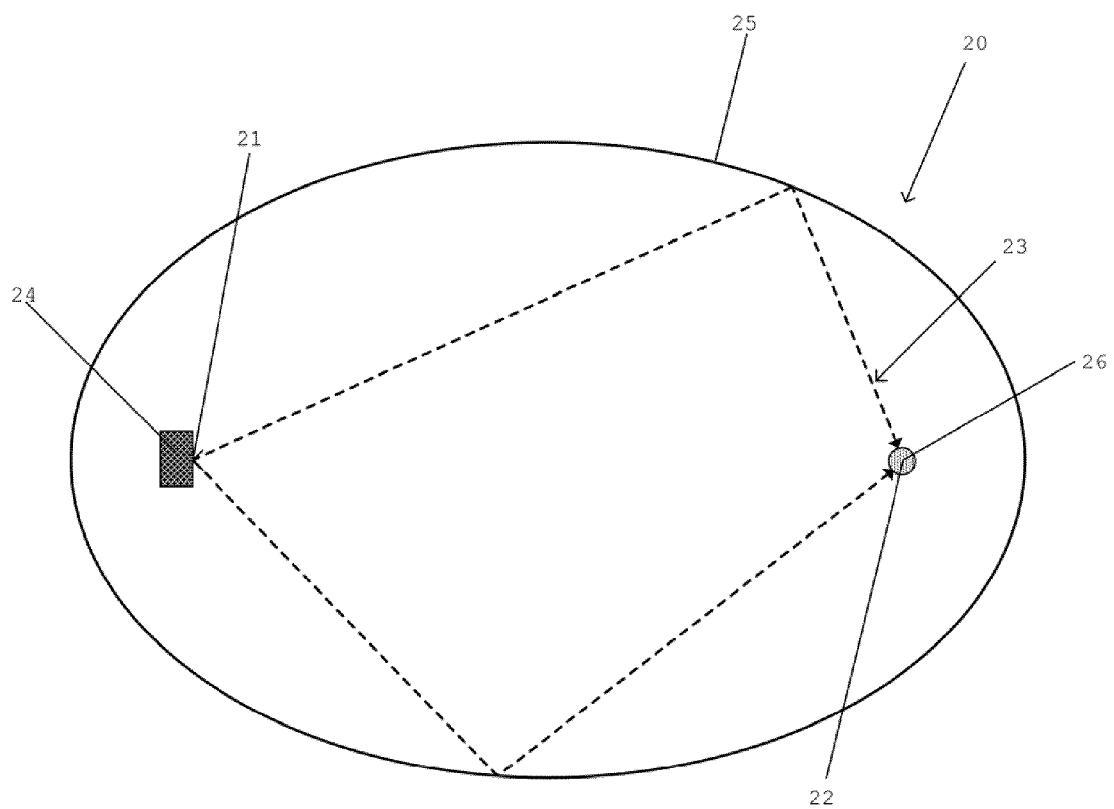
FIG. 3 schematically depicts a cross-sectional view of an exemplary apparatus for curing a coated glass fiber.

Accordingly, in one embodiment, each UVLED source may be positioned along the other line focus (i.e., the line focus that does not correspond with a curing axis) such that each UVLED source emits UV radiation in the general direction of the curing axis. In this regard, FIGS. 2 and 3 depict an exemplary apparatus 20 for curing a coated glass fiber 26. The apparatus 20 includes a substantially cylindrical cavity 25 having an elliptical shape and a reflective inner surface. The cavity 25 defines a first line focus 21 and a second line focus 22. One or more UVLED sources 24 are positioned along the first line focus 21. Typically, each UVLED source 24 is formed from a single light emitting diode. That said, it is within the scope of the present invention to employ an array of small light emitting diodes to form each UVLED source 24.

In one embodiment, the apparatus 20 may include a plurality of UVLED sources 24 positioned contiguously to one another along the first line focus 21 (i.e., directly stacked). In another embodiment, adjacent UVLED sources may be vertically separated by a space of at least about 5 millimeters (e.g., at least about 10 millimeters). The second line focus 22 further defines a curing axis along which a coated glass fiber 26 passes so it can be cured. As depicted in FIG. 3, UV rays 23 emitted from the UVLED source 24 may reflect off the inner surface of the cavity 25 such that the reflected UV rays 23 are incident to the coated glass fiber 26.

To facilitate uniform curing of the coated glass fiber 26, some of the UVLED sources 24 may be differently oriented. The apparatus 20 typically includes a single UVLED positioned within a particular horizontal plane. In an alternative embodiment, multiple UVLEDs may be positioned (e.g., at a point other than the first focal line) within a horizontal plane to promote more uniform curing of the glass fiber.

In another embodiment, a system for curing a coated glass fiber may include a plurality of differently oriented cavity segments (e.g., apparatuses for curing a coated glass fiber). Each cavity may have a common curing axis (e.g., the second focal line), but a different first line focus.

As depicted in FIG. 2, a second apparatus 30 for curing a glass fiber may have a different orientation than the first apparatus 20 (e.g., the second apparatus 30 may have UVLED sources positioned along a line focus 31 that differs from the first line focus 21). As further illustrated in FIG. 2, the second apparatus 30 is rotated 180 degrees relative to the orientation of the first apparatus 20. That said, various degrees of rotation may separate adjacent cavity segments (i.e., adjacent apparatuses). By way of non-limiting illustration, a 45-degree rotation, a 90-degree rotation, or a 135-degree rotation may separate adjacent cavity segments while maintaining the common curing axis.

In this regard, the positioning of a plurality of cavity segments in a three-dimensional arrangement may be defined by the cylindrical coordinate system (i.e., r, $\theta$, z). Using the cylindrical coordinate system and as described herein, the curing axis defines a z-axis. Furthermore, as herein described and as will be understood by those having ordinary skill in the art, the variable r is the perpendicular distance of a point to the z-axis. The variable $\theta$ describes the angle in a plane that is perpendicular to the z-axis. In other words and by reference to a Cartesian coordinate system (i.e., defining an x-axis, a y-axis, and a z-axis), the variable $\theta$ describes the angle between a reference axis (e.g., the x-axis) and the orthogonal projection of a point onto the x-y plane. Finally, the z variable describes the height or position of a reference point along the z-axis.

Thus, a point is defined by its cylindrical coordinates (r, $\theta$, z). For cavity segments employed in exemplary configurations, the variable r is usually constant and may refer to the distance between the first line focus of a cavity segment and the curing axis (e.g., where the respective cavity segments employ the same elliptical dimensions). Accordingly, to the extent the variable r is largely fixed, the position of the cavity segments can be described by their respective z and $\theta$ coordinates.

By way of non-limiting example, a plurality of cavity segments having the same elliptical dimensions may be positioned in a helical arrangement with the first cavity segment at the position (1, 0, 0), where r is fixed at a constant distance (i.e., represented here as a unitless 1). Additional cavity segments may be positioned, for example, every 90 degrees (i.e., $\pi/2$) with a $\Delta z$ of 1 (i.e., a positional step change represented here as a unitless 1). Thus, a second cavity segment would have the coordinates (1, $\pi/2$, 1), a third cavity segment would have the coordinates (1, $\pi$, 2), and a fourth cavity segment would have the coordinates (1, $3\pi/2$, 3), thereby defining a helical configuration. In other words, the respective cavity segments are rotated around the curing axis.

That said, the respective distances r and z need not be equivalent. Moreover, the several cavity segments in an arrangement as herein disclosed need not be offset by 90 degrees (e.g., $\pi/2$, $\pi$, $3\pi/2$, etc.). For example, the respective cavity segments may be offset by 60 degrees (e.g., $\pi/3$, $2\pi/3$, $\pi$, etc.) or by 120 degrees (e.g., $2\pi/3$, $4\pi/3$, $2\pi$, etc.). Indeed, the cavity segments in an arrangement as discussed herein need not follow a regularized helical rotation.

Applicant has discovered that the protective tube interferes with the UV radiation directed toward the curing axis.

By way of example, Applicant simulated directing a 0.1-millimeter wide UVLED having an emission pattern of $\cos^{1.5}(\Phi)$ directly toward (i.e., employing an emission angle of 0 degrees) a target having a diameter of 250 microns, the approximate diameter of a representative optical fiber. As used herein, the size of a UVLED refers to its actual size or, if the UVLED is rescaled with a lens, its effective size. The simulation positioned the UVLED source and the target at opposite foci within a reflective elliptic cylinder having a major axis length of 54 millimeters and a minor axis length of 45.8 millimeters. In the absence of a protective tube, nearly 100 percent of the UV rays hit the target.

When a protective tube having a diameter of 24 millimeters and a refractive index of 1.5 is employed, however, only about 75 percent of the UV rays hit the 250-micron target. In this regard, UV rays having an incidence angle other than approximately 90 degrees with the protective tube can be undesirably refracted or reflected.

Applicant also simulated directing the UVLED toward a 250-micron target surrounded by a protective tube while employing an emission angle of 90 degrees rather than 0 degrees. Table 1 (below) shows UVLED efficiency (i.e., the percent of UV radiation hitting a 250-micron target) at respective emission angles of 0 degrees and 90 degrees for UVLEDs of various widths.

TABLE 1

| | (UVLED Efficiency) | |
|---|---|---|
| UVLED Width (mm) | UVLED Efficiency (0° emission angle) | UVLED Efficiency (90° emission angle) |
| 0.1 | 77 | 100 |
| 0.2 | 77 | 79 |
| 0.3 | 77 | 61 |
| 0.4 | 77 | 50 |
| 0.5 | 76 | 43 |
| 1 | 45 | 25 |
| 1.5 | 31 | 17 |
| 2 | 24 | 13 |
| 2.5 | 19 | 11 |

Table 2 (below) shows UVLED efficiency for a UVLED having a width (or effective width) of 0.1 mm.

TABLE 2

| | | (UVLED Efficiency) | | | |
|---|---|---|---|---|---|
| Elliptic Cylinder Major Axis Width (mm) | Elliptic Cylinder Minor Axis Width (mm) | Protective Tube Diameter (mm) | Emission Pattern | Emission Angle (degrees) | UVLED Efficiency (percentage) |
| 54 | 45.8 | — | $\cos^2(\Phi)$ | 0 | 100 |
| 54 | 45.8 | 24 | $\cos^2(\Phi)$ | 0 | 75 |
| 54 | 45.8 | 24 | $\cos^{1.5}(\Phi)$ | 0 | 77 |
| 54 | 45.8 | 24 | $\cos^{1.5}(\Phi)$ | 90 | 100 |
| 60 | 51.8 | 24 | $\cos^{1.5}(\Phi)$ | 0 | 78 |
| 60 | 51.8 | 24 | $\cos^{1.5}(\Phi)$ | 90 | 100 |

Figure 4:
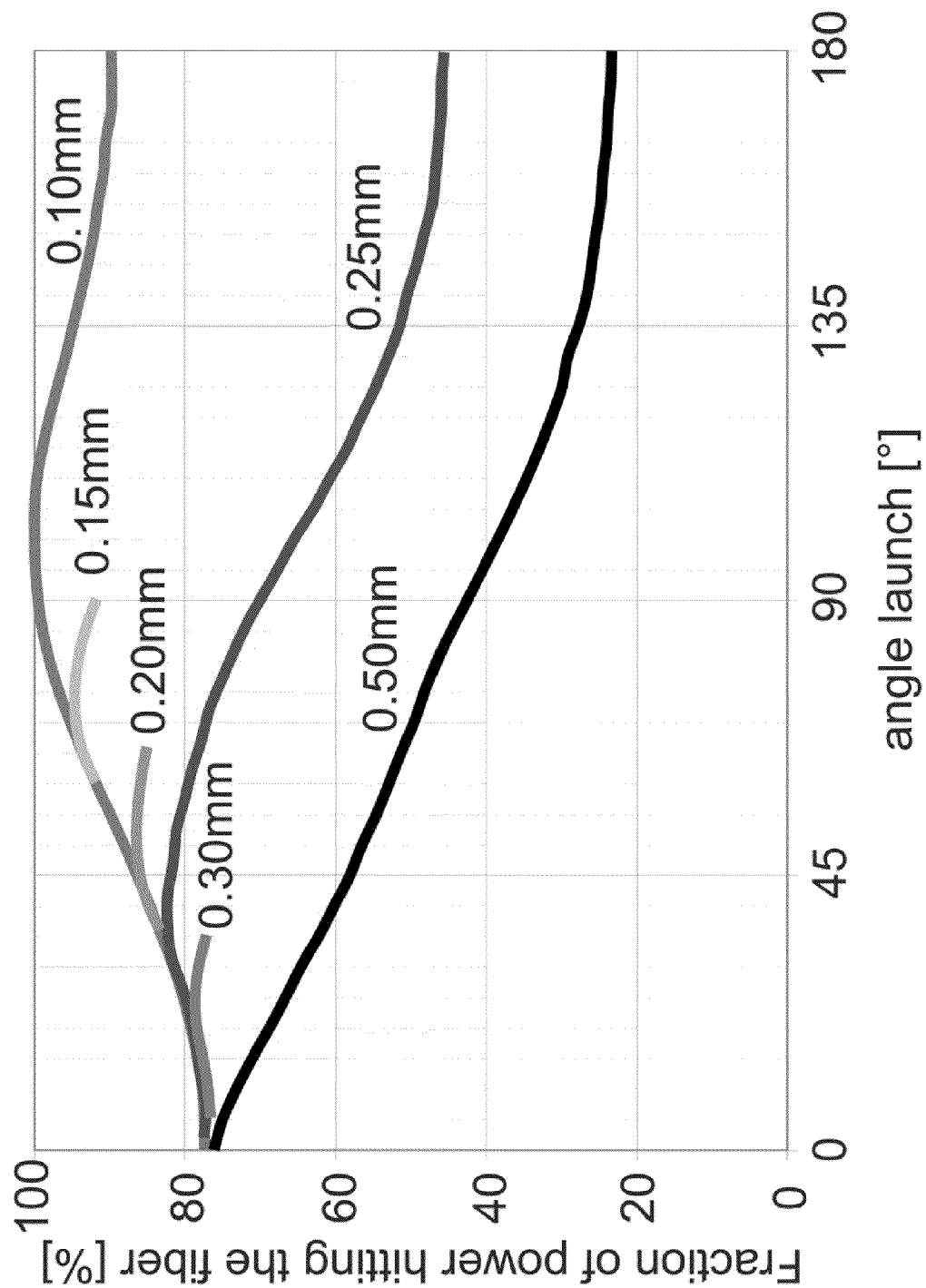
FIG. 4 schematically depicts the relationship between UVLED emission angle and UVLED efficiency for UVLEDs of various widths.

Applicant further simulated UVLED efficiency for various emission angles using various UVLEDs, where (i) the reflective elliptic cylinder had a major axis length of 54 millimeters and a minor axis length of 45.8 millimeters, (ii) the protective tube had a diameter of 24 millimeters, and (iii) the UVLED had an emission pattern of $\cos^{2.5}(\Phi)$. For this apparatus configuration, FIG. 4 graphically depicts the relationship between UVLED emission angle and UVLED efficiency for UVLEDs of various widths. In brief, FIG. 4 shows that for a UVLED having a width of less than 0.5 millimeter, employing an emission angle of more than 0 degrees improves UVLED efficiency.

For UVLEDs having a width (or effective width) of less than about 0.5 millimeter (as deployed in the foregoing apparatus configuration), emission angle $\alpha$ can be optimally calculated in accordance with the following equation:

$$\alpha = 733.33x^2 - 690x + 161.67, \text{ where}$$

x is the width of the UVLED,
x<0.5 millimeter, and
the UVLED has an emission pattern of $\cos^{1.5}(\Phi)$.

Moreover, for the foregoing apparatus configuration, the UVLED efficiency can be optimally calculated in accordance with the following equation:

$$\text{UVLED efficiency} = 1001.3x^3 + 1166.1x^2 - 461.6x + 140.45, \text{ where}$$

x is the width of the UVLED,
x<0.5 millimeter, and
the UVLED has an emission pattern of $\cos^{1.5}(\Phi)$.

For a point source, the optimum emission angle $\alpha$ typically has a minimum value $\alpha_{min}$ and a maximum value $\alpha_{max}$ according to the following equations:

$$\alpha_{min} = \theta_{source}/2 + \arctan(r_{tube}/(2f)), \text{ and}$$

$\alpha_{max} = 2\pi - \alpha_{min}$,
where
$r_{tube}$ is the radius of the protective tube,
f is the distance from the central axis of the elliptic cylinder to a line focus (i.e., 2f is the distance between the line foci), and
$\theta_{source}$ is the angle of the emittance cone of the point source that contains 95 percent of the emitted power from the point source.

As noted, the emittance cone of the point source contains 95 percent of the emitted power from the point source. Therefore, 95 percent of the emitted power from the point source is emitted within the cone defined by the equation $\alpha + k \cdot \theta_{source}$, where $-0.5 \le k \le 0.5$.

By way of a non-limiting example, if $\theta_{source} = 154$ degrees, f=28 millimeters, and $r_{tube} = 12$ millimeters, then $\alpha_{min} = 89$ degrees and $\alpha_{max} = 271$ degrees.

Those having ordinary skill will appreciate that the UV radiation emitted from a UVLED source is not emitted from a single point. That said, the foregoing equation for calculating the optimum emission angle of a point source is a useful tool for approximating the optimum emission angle of small UVLED sources, such as UVLED sources with a width of 0.2 millimeter or less (e.g., 0.1 millimeter or less).

More generally and in accordance with the present invention, the optimum emission angle is typically at least about 30 degrees, such as between 30 degrees and 100 degrees (e.g., about 90 degrees for a UVLED having a width of about 0.3 millimeter or less), more typically between about 30 degrees and 60 degrees (e.g., about 45 degrees for a UVLED having a width of about 0.22 millimeter), between each UVLED source and the major axis of the elliptical cylinder. In this regard, ever smaller UVLEDs may facilitate the deployment of a curing apparatus that can efficiently employ emission angles approaching 180 degrees. By way of example, such a curing apparatus might employ emission angles greater than about 100 degrees, such as between about 120 degrees and 150 degrees (e.g., about 135 degrees). When a protective tube is present within the elliptical cylinder (i.e., surrounding the curing axis), employing an angled UVLED source in this way will provide improved UV absorption during curing.

Figure 5:
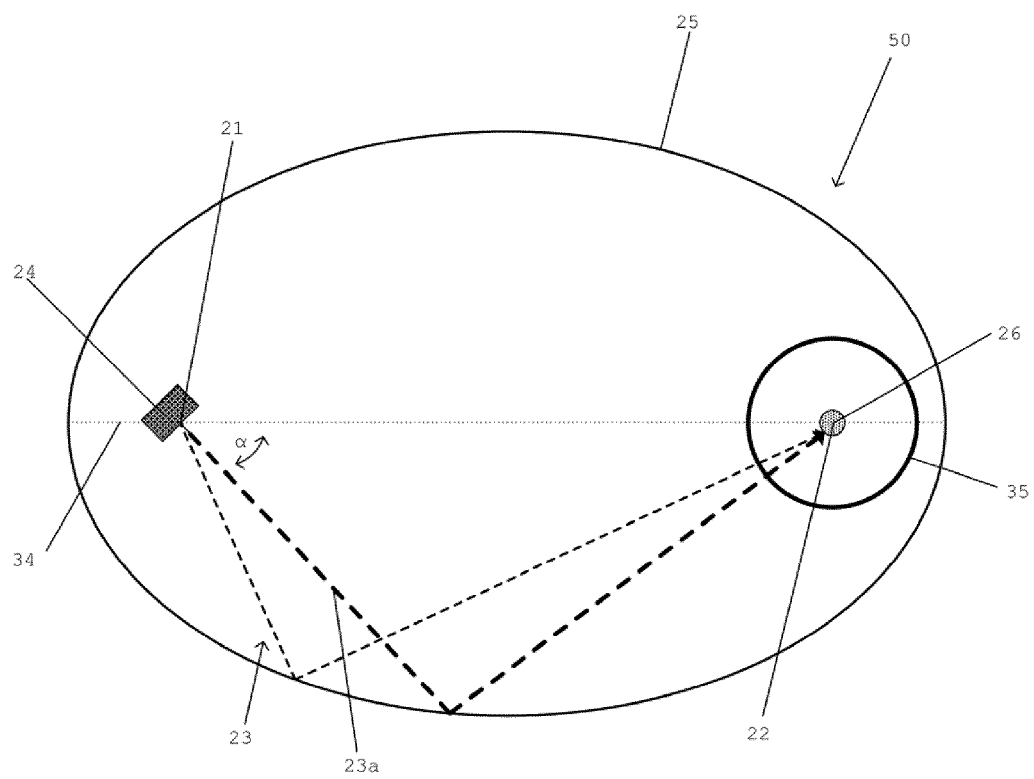
FIG. 5 schematically depicts a cross-sectional view of another exemplary apparatus for curing a coated glass fiber.

FIG. 5 depicts an exemplary apparatus 50 for curing a coated glass fiber 26 in accordance with the present invention. In particular, the apparatus 50 employs one or more angled UVLED sources 24 positioned within a substantially cylindrical cavity 25 having an elliptical shape and a reflective inner surface. The cavity 25 defines a first line focus 21 and a second line focus 22. The second line focus 22 defines a curing axis. A coated glass fiber 26 passes along the curing axis during curing. Finally, a protective tube 35 surrounds the curing axis and the coated glass fiber 26.

The cavity 25 also defines a major axis 34 that intersects the first line focus 21 and the second line focus 22. One or more UVLED sources 24 are positioned along the first line focus 21. Each UVLED source 24 emits UV rays 23 in a distinctive emission pattern. In general, an emission pattern has a line of average emission $L_{avg}$ 23a (i.e., an average of all the UV rays emitted by the UVLED source 24).

In an exemplary embodiment, an UVLED source 24 is angled away from the coated glass fiber 26. In particular, the UVLED source 24 is positioned so that an emission angle $\alpha$ is defined between the line of average emission $L_{avg}$ 23a and the elliptical cylinder's major axis 34. The emission angle $\alpha$ is typically between about 30 degrees and 100 degrees (e.g., between 30 degrees and 60 degrees), more typically between about 40 degrees and 50 degrees (e.g., 45 degrees).

Although the emission angle $\alpha$ is typically calculated relative to the line of average emission $L_{avg}$ for a UVLED source (e.g., a single UVLED), it is within the scope of the invention to describe the emission angle $\alpha$ relative to a line defined by a UVLED source's median or mode (i.e., a line of maximum emission $L_{max}$).

Typically, each UVLED source within the cavity is oriented to have the same emission angle. That said, it is within the scope of the present invention to orient UVLED sources within the cavity such that the UVLED sources have different emission angles.

Those having ordinary skill in the art will appreciate that the UV radiation emitted from a UVLED is not emitted from a single point. Therefore, and because of the small size of a coated glass fiber (e.g., a 250-micron diameter), it is desirable to use small UVLED sources (e.g., a 3-millimeter square UVLED or a 1-millimeter square UVLED). In general, a greater percentage of reflected UV radiation will be incident to the coated glass fiber using a small UVLED as compared with using a larger UVLED.

Moreover, each UVLED source may include a lens (e.g., a convex lens, such as a biconvex or plano-convex lens) for focusing emitted UV radiation. In particular, each lens may have a focus at one of the two line foci (e.g., the line focus not defining a curing axis). For example, a cylindrical lens with a high numerical aperture can be used to rescale a 3-millimeter square UVLED so that it has an effective width of about 0.4 millimeter or less at the line focus. By including a lens with each UVLED, the efficiency of the apparatus may be further enhanced.

In an alternative embodiment, the apparatus for curing a coated glass fiber may employ one or more optical fibers (e.g., one or more multimode optical fibers) to transmit UV radiation. In this regard, these optical fibers are typically positioned along the first line focus of the apparatus as an alternative to positioning UVLEDs along the first line focus. Typically, each optical fiber is coupled to one or more sources of UV radiation, such as a UVLED. By way of example, a plurality of small UVLEDS may be coupled to a plurality of optical fibers in a one-to-one relationship (e.g., 20 UVLEDS and 20 optical fibers). Thereupon, the optical fibers may be configured in various arrays at or near the first line focus.

Moreover, at least one—and typically each—optical fiber is oriented at the first line focus to provide an emission angle of between about 30 degrees and 120 degrees (e.g., between 45 degrees and 90 degrees). Such optical fibers typically employ a central glass fiber, but may alternatively employ a central plastic fiber.

Moreover, the use of an optical fiber to transmit UV radiation into the cavity may facilitate the deployment of a curing apparatus that can efficiently employ emission angles approaching 180 degrees. By way of example, such a curing apparatus might employ emission angles between 120 degrees and 180 degrees (e.g., about 150 degrees).

To simplify coupling with the UVLED source(s), multimode optical fibers are typically employed for purposes of UV-radiation transmission. That said, it is within the scope of the present invention to employ single-mode optical fibers (e.g., holey glass fibers). An exemplary single-mode optical fiber is a large-mode-area fiber (LMA) that provides a Gaussian beam having a diameter of 0.1 millimeter or less. An exemplary holey optical fiber is disclosed in commonly assigned U.S. Patent Application Publication No. 2010/0189397 for a Single-Mode Optical Fiber (Richard et al.), which is hereby incorporated by reference in its entirety.

To supplement the foregoing disclosure, this application incorporates entirely herein by reference commonly assigned U.S. Patent Application Publication No. US2010/0183821 A1 for a UVLED Apparatus for Curing Glass-Fiber Coatings (Hartsuiker et al.); commonly assigned U.S. Patent Application No. 61/351,205 for a Curing Apparatus Having UV Sources That Emit Differing Ranges of UV Radiation, filed Jun. 3, 2010, (Gharbi et al.); and commonly assigned U.S. Patent Application No. 61/372,312 for a Method and Apparatus Providing Increased UVLED Intensity, filed Aug. 10, 2010, (Overton). This application further incorporates entirely herein by reference U.S. Pat. No. 4,683,525; U.S. Pat. No. 4,710,638; U.S. Pat. No. 7,399,982; and U.S. Pat. No. 7,498,065.

UVLEDs are capable of emitting wavelengths within a much smaller spectrum than conventional UV lamps. This promotes the use of more of the emitted electromagnetic radiation for curing. That said, the UVLED apparatus (and its related system and method) disclosed herein may be modified to employ mercury lamps and/or fusion lamps as radiation sources (e.g., a supplemental source of UV radiation if insufficient curing is achieved using only UVLEDs).

In this regard, a UVLED source for use in the present invention may be any suitable UVLED that emits electromagnetic radiation having wavelengths of between about 200 nanometers and 600 nanometers. By way of example, the UVLED may emit electromagnetic radiation having wavelengths of between about 200 nanometers and 450 nanometers (e.g., between about 250 nanometers and 400 nanometers). In a particular exemplary embodiment, the UVLED may emit electromagnetic radiation having wavelengths of between about 300 nanometers and 400 nanometers. In another particular exemplary embodiment, the UVLED may emit electromagnetic radiation having wavelengths of between about 350 nanometers and 425 nanometers.

As noted, a UVLED typically emits a narrow band of electromagnetic radiation. For example, the UVLED may substantially emit electromagnetic radiation having wavelengths that vary by no more than about 30 nanometers, typically no more than about 20 nanometers (e.g., a UVLED emitting a narrow band of UV radiation mostly between about 375 nanometers and 395 nanometers). It has been observed that a UVLED emitting a narrow band of UV radiation mostly between about 395 nanometers and 415 nanometers is more efficient than other narrow bands of UV radiation.

Moreover, it has been observed that in some cases UVLEDs emitting UV radiation slightly above the wavelength at which a glass-fiber coating has maximum absorption (e.g., an absorption peak of about 360 nanometers) promote more efficient polymerization than do UVLEDs emitting UV radiation at the wavelength at which the glass-fiber coating has maximum absorption. Accordingly, the UVLED apparatus may employ UVLEDs that have a mean output wavelength at least about 10 nanometers greater than the glass-fiber coating's targeted absorption peak (e.g., at least about 10 to 15 nanometers greater than a targeted absorption peak). That said, it is within the scope of the present invention to employ UVLEDs that have a mean output wavelength within about 10 nanometers (e.g., within about 5 nanometers) of a targeted absorption peak.

In this regard, although an exemplary UVLED source emits substantially all of its electromagnetic radiation within a defined range (e.g., between 350 nanometers and 450 nanometers, such as between 370 nanometers and 400 nanometers), the UVLED source may emit small amounts of electromagnetic radiation outside the defined range. In this regard, 80 percent or more (e.g., at least about 90 percent) of the output (i.e., emitted electromagnetic radiation) of an exemplary UVLED source is typically within a defined range (e.g., between about 375 nanometers and 425 nanometers).

Figure 6A:
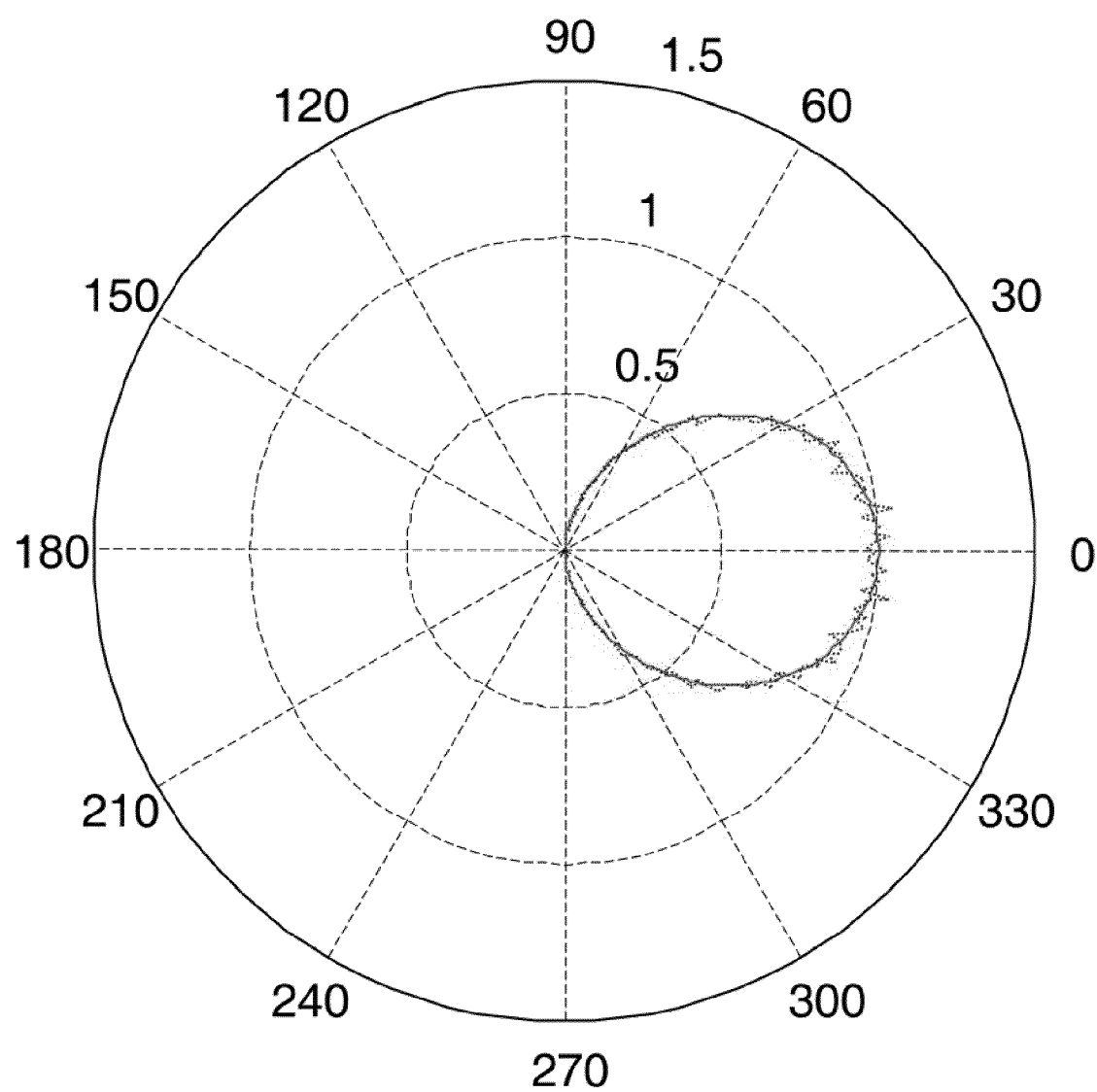
FIG. 6a schematically depicts the emission pattern of a UVLED having an emission pattern of $\cos^{1.5}(\Phi)$ FIG. 6b schematically depicts the emission pattern of a UVLED having an emission pattern of $\cos^{2}(\Phi)$.
Figure 6B:
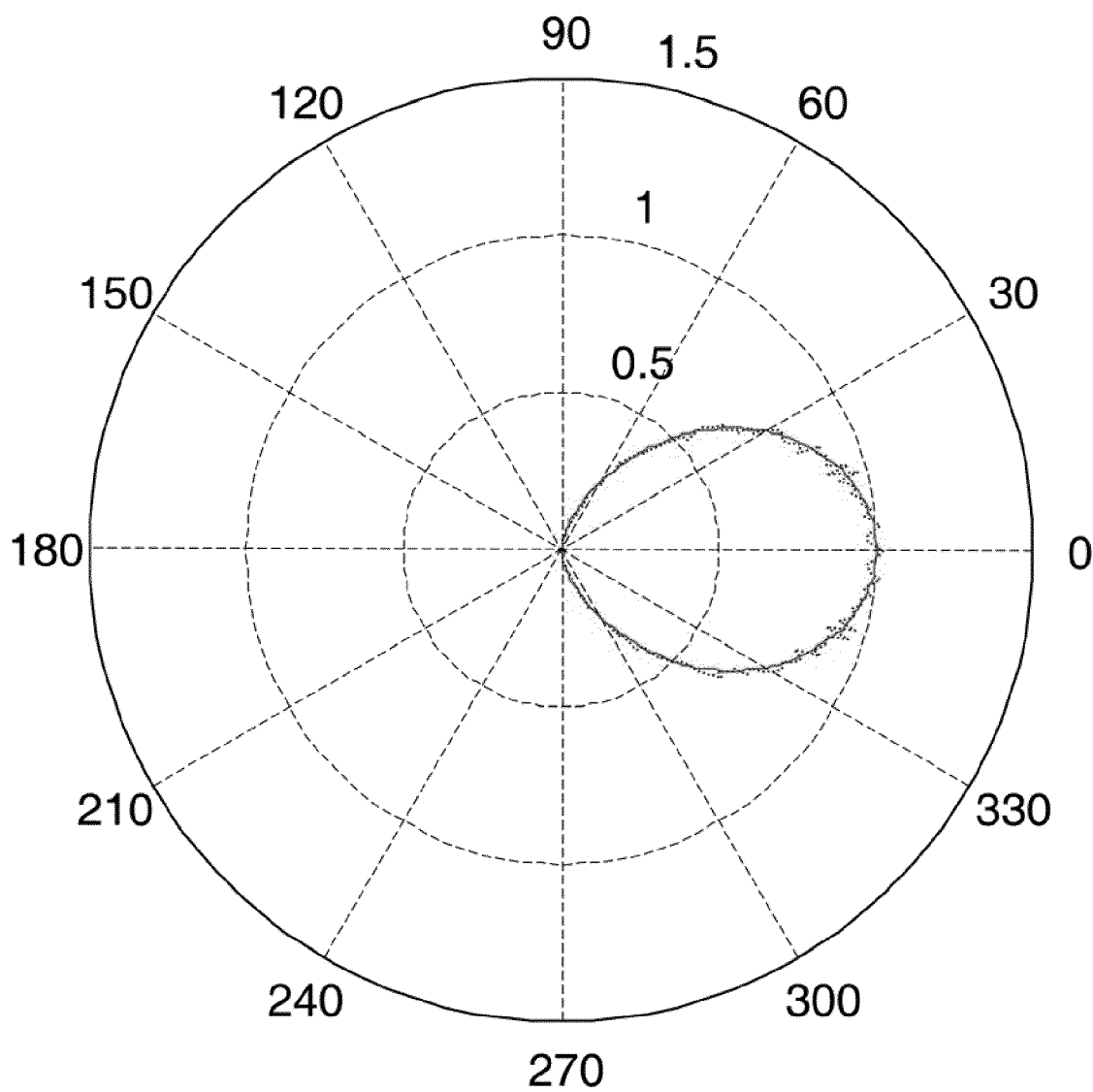

As noted, UVLEDs can have various emission patterns (e.g., a far field pattern). By way of example, a UVLED employed in accordance with the present invention may have a substantially Lambertian emission pattern. In other embodiments, a UVLED source (e.g., a UVLED) may have a Gaussian or multimodal emission pattern. Another exemplary UVLED may have an emission pattern of $\cos^{1.5}(\Phi)$ or $\cos^2(\Phi)$. FIG. 6a schematically depicts the emission pattern of a UVLED having an emission pattern of $\cos^{1.5}(\Phi)$. FIG. 6b schematically depicts the emission pattern of a UVLED having an emission pattern of $\cos^2(\Phi)$.

UVLEDs are typically much smaller than conventional UV lamps (e.g., mercury bulbs). By way of example, the UVLED may be a 0.25-inch square UVLED. The UVLED may be affixed to a platform (e.g., a 1-inch square or larger mounting plate). Of course, other UVLED shapes and sizes are within the scope of the present invention. By way of example, a 3-millimeter square UVLED may be employed in the apparatus according to the present invention.

Each UVLED may have a power output of as much as 32 watts (e.g., a UVLED having a power input of about 160 watts and a power output of about 32 watts). That said, UVLEDs having outputs greater than 32 watts (e.g., 64 watts) may be employed as such technology becomes available. Using UVLEDs with higher power output may be useful for increasing the rate at which optical-fiber coatings cure, thus promoting increased production line speeds.

Each UVLED source may be positioned at a distance of between about 1 millimeter and 100 millimeters (e.g., typically between about 5 millimeters and 30 millimeters) from the optical fiber to be cured (e.g., from the curing axis). More typically, each UVLED source is positioned at a distance of about 25 millimeters from the optical fiber to be cured.

It will be further appreciated by those having ordinary skill in the art that UVLEDs may absorb incident electromagnetic radiation, which might diminish the quantity of reflected UV radiation available for absorption by the glass-fiber coating.

Moreover, incident UV radiation can damage a UVLED. Therefore, in an apparatus for curing glass-fiber coatings having a plurality of UVLEDs, it may be desirable to position the UVLEDs in a way that reduces UV radiation incident to the UVLEDs. Accordingly, a vertical space of at least about 10 millimeters may separate adjacent UVLEDs. Moreover, the UVLEDs may employ a reflective surface (e.g., a surface coating) that promotes reflection of incident electromagnetic radiation yet permits the transmission of emitted electromagnetic radiation.

It may be desirable for the power of the UV radiation incident to the optical fiber to vary as the optical fiber progresses through the apparatus. Varying the power of the UV radiation may enhance the curing of the glass-fiber coating. Depending on the curing properties of a particular coating, it may be desirable to initially expose the optical fiber to high intensity UV radiation. Alternatively, it may be desirable to initially expose the optical fiber to lower intensity UV radiation (e.g., between about 10 percent and 50 percent of the maximum exposure intensity) before exposing the optical fiber to high intensity UV radiation (e.g., the maximum intensity to which the optical fiber is exposed). In this regard, initially exposing the optical fiber to lower intensity UV radiation may be useful in controlling the generation of free radicals in an uncured coating. Those having ordinary skill in the art will appreciate that if too many free radicals are present, many of the free radicals may recombine rather than encourage the polymerization of the glass-fiber coating—an undesirable effect. Accordingly, in an apparatus containing a plurality of UVLED sources, the intensity of the UV radiation output from the UVLED sources may vary.

In this regard, an apparatus as described herein may include a dark space between one or more UVLED sources. In other words, the apparatus may include a space in which substantially no UV radiation is incident to the optical fiber being cured. A pause in the curing process provided by a dark space can help to ensure even and efficient curing of the optical-fiber coatings. In particular, a dark space may be useful in preventing too many free radicals from being present in a glass-fiber coating before it is cured (i.e., dark space helps to control free-radical generation).

For example, it may be desirable to initially expose an optical fiber to low power UV radiation and then pass the optical fiber through a dark space. After the optical fiber passes through a dark space, it is exposed to higher power UV radiation to complete the curing process. A curing apparatus employing dark space is disclosed in commonly assigned U.S. Pat. No. 7,322,122 for a Method and Apparatus for Curing a Fiber Having at Least Two Fiber Coating Curing Stages, which is hereby incorporated by reference in its entirety.

Moreover, an apparatus for curing glass-fiber coatings may include a control circuit for controlling the UV radiation output from the UVLED sources. The control circuit may be used to vary the intensity of the UV radiation as an optical fiber progresses through the apparatus.

Alternatively, to ensure that the optical fiber receives a consistent dose of ultraviolet radiation, the UV radiation output of the UVLED sources may vary with the speed at which the optical fiber passes through the apparatus. That is to say, at higher speeds (i.e., the speed the optical fiber passes through the apparatus), the output intensity of the UVLED sources may be greater than the output intensity at lower speeds. The output intensity of the UVLED sources may be controlled by reducing (or increasing) the current flowing to the UVLEDs.

Finally, glass fiber is typically rotated or otherwise subjected to perturbations during drawing operations to reduce unwanted dispersion effects. It is thought that this may further enhance the curing process as herein described.

The foregoing description embraces the curing of one or more coating layers on a glass fiber. The disclosed apparatus, system, and method may be similarly employed to cure a buffer layer onto an optical fiber or a ribbon matrix around a plurality of optical fibers.

Relative to other UV radiation sources, UVLED devices typically generate a smaller amount of heat energy. That said, to dissipate the heat energy created by a UVLED, a heat sink may be located behind the UVLED (e.g., opposite the portion of the UVLED that emits UV radiation). The heat sink may be one-inch square, although other heat sink shapes and sizes are within the scope of the present invention.

The heat sink may be formed of a material suitable for conducting heat (e.g., brass, aluminum, or copper). The heat sink may include a heat exchanger that employs a liquid coolant (e.g., chilled water), which circulates within the heat exchanger to draw heat from the UVLED.

Removing heat generated by the UVLED is important for several reasons. First, excess heat may slow the rate at which optical-fiber coatings cure. Furthermore, excess heat can cause the temperature of the UVLED to rise, which can reduce UV-radiation output. Indeed, continuous high-temperature exposure can permanently reduce the UVLED's radiation output. With adequate heat removal, however, the UVLED may have a useful life of 50,000 hours or more.

In accordance with the foregoing, the resulting optical fiber includes one or more coating layers (e.g., a primary coating and a secondary coating). At least one of the coating layers—typically the secondary coating—may be colored and/or possess other markings to help identify individual fibers. Alternatively, a tertiary ink layer may surround the primary and secondary coatings.

For example, the resulting optical fiber may have one or more coatings (e.g., the primary coating) that comprise a UV-curable, urethane acrylate composition. In this regard, the primary coating may include between about 40 and 80 weight percent of polyether-urethane acrylate oligomer as well as photoinitiator, such as LUCIRIN® TPO, which is commercially available from BASF. In addition, the primary coating typically includes one or more oligomers and one or more monomer diluents (e.g., isobornyl acrylate), which may be included, for instance, to reduce viscosity and thereby promote processing. Exemplary compositions for the primary coating include UV-curable urethane acrylate products provided by DSM Desotech (Elgin, Ill.) under various trade names, such as DeSolite® DP 1011, DeSolite® DP 1014, DeSolite® DP 1014XS, and DeSolite® DP 1016. An exemplary coating system is available from Draka Comteq under the trade name COLORLOCK®$^{XS}$.

Those having ordinary skill in the art will recognize that an optical fiber with a primary coating (and an optional secondary coating and/or ink layer) typically has an outer diameter of between about 235 microns and about 265 microns (μm). The component glass fiber itself (i.e., the glass core and surrounding cladding layers) typically has a diameter of about 125 microns, such that the total coating thickness is typically between about 55 microns and 70 microns.

With respect to an exemplary optical fiber achieved according to the present curing method, the component glass fiber may have an outer diameter of about 125 microns. With respect to the optical fiber's surrounding coating layers, the primary coating may have an outer diameter of between about 175 microns and about 195 microns (i.e., a primary coating thickness of between about 25 microns and 35 microns) and the secondary coating may have an outer diameter of between about 235 microns and about 265 microns (i.e., a secondary coating thickness of between about 20 microns and 45 microns). Optionally, the optical fiber may include an outermost ink layer, which is typically between two and ten microns thick.

In an alternative embodiment, the resulting optical fiber may possess a reduced diameter (e.g., an outermost diameter between about 150 microns and 230 microns). In this alternative optical-fiber configuration, the thickness of the primary coating and/or secondary coating is reduced, while the diameter of the component glass fiber is maintained at about 125 microns. By way of example, in such embodiments, the primary coating layer may have an outer diameter of between about 135 microns and about 175 microns (e.g., about 160 microns), and the secondary coating layer may have an outer diameter of between about 150 microns and about 230 microns (e.g., more than about 165 microns, such as 190-210 microns or so). In other words, the total diameter of the optical fiber is reduced to less than about 230 microns (e.g., about 200 microns).

Exemplary coating formulations for use with the apparatus and method described herein are disclosed in the following commonly assigned applications, each of which is incorporated by reference in its entirety: U.S. Patent Application No. 61/112,595 for a Microbend-Resistant Optical Fiber, filed Nov. 7, 2008, (Overton); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); and U.S. Patent Application Publication No. US20100119202 A1 for a Reduced-Diameter Optical Fiber (Overton).

To supplement the present disclosure, this application incorporates entirely by reference the following commonly assigned patents, patent application publications, and patent applications: U.S. Pat. No. 4,838,643 for a Single Mode Bend Insensitive Fiber for Use in Fiber Optic Guidance Applications (Hodges et al.); U.S. Pat. No. 7,623,747 for a Single Mode Optical Fiber (de Montmorillon et al.); U.S. Pat. No. 7,587,111 for a Single-Mode Optical Fiber (de Montmorillon et al.); U.S. Pat. No. 7,356,234 for a Chromatic Dispersion Compensating Fiber (de Montmorillon et al.); U.S. Pat. No. 7,483,613 for a Chromatic Dispersion Compensating Fiber (Bigot-Astruc et al.); U.S. Pat. No. 7,526,177 for a Fluorine-Doped Optical Fiber (Matthijsse et al.); U.S. Pat. No. 7,555,186 for an Optical Fiber (Flammer et al.); U.S. Patent Application Publication No. US2009/0252469 A1 for a Dispersion-Shifted Optical Fiber (Sillard et al.); U.S. Patent Application Publication No. US2011/0044595 A1 for a Transmission Optical Fiber Having Large Effective Area (Sillard at al.); International Patent Application Publication No. WO 2009/062131 A1 for a Microbend-Resistant Optical Fiber, (Overton); U.S. Patent Application Publication No. US2009/0175583 A1 for a Microbend-Resistant Optical Fiber, (Overton); U.S. Patent Application Publication No. US2009/0279835 A1 for a Single-Mode Optical Fiber Having Reduced Bending Losses, filed May 6, 2009, (de Montmorillon et al.); U.S. Pat. No. 7,889,960 for a Bend-Insensitive Single-Mode Optical Fiber, (de Montmorillon et al.); U.S. Patent Application Publication No. US2010/0021170 A1 for a Wavelength Multiplexed Optical System with Multimode Optical Fibers, filed Jun. 23, 2009, (Lumineau et al.); U.S. Patent Application Publication No. US2010/0028020 A1 for a Multimode Optical Fibers, filed Jul. 7, 2009, (Gholami et al.); U.S. Patent Application Publication No. US2010/0119202 A1 for a Reduced-Diameter Optical Fiber, filed Nov. 6, 2009, (Overton); U.S. Patent Application Publication No. US2010/0142969 A1 for a Multimode Optical System, filed Nov. 6, 2009, (Gholami et al.); U.S. Patent Application Publication No. US2010/0118388 A1 for an Amplifying Optical Fiber and Method of Manufacturing, filed Nov. 12, 2009, (Pastouret et al.); U.S. Patent Application Publication No. US2010/0135627 A1 for an Amplifying Optical Fiber and Production Method, filed Dec. 2, 2009, (Pastouret et al.); U.S. Patent Application Publication No. US2010/0142033 for an Ionizing Radiation-Resistant Optical Fiber Amplifier, filed Dec. 8, 2009, (Regnier et al.); U.S. Patent Application Publication No. US2010/0150505 A1 for a Buffered Optical Fiber, filed Dec. 11, 2009, (Testu et al.); U.S. Patent Application Publication No. US2010/0171945 for a Method of Classifying a Graded-Index Multimode Optical Fiber, filed Jan. 7, 2010, (Gholami et al.); U.S. Patent Application Publication No. US2010/0189397 A1 for a Single-Mode Optical Fiber, filed Jan. 22, 2010, (Richard et al.); U.S. Patent Application Publication No. US2010/0189399 A1 for a Single-Mode Optical Fiber Having an Enlarged Effective Area, filed Jan. 27, 2010, (Sillard et al.); U.S. Patent Application Publication No. US2010/0189400 A1 for a Single-Mode Optical Fiber, filed Jan. 27, 2010, (Sillard et al.); U.S. Patent Application Publication No. US2010/0214649 A1 for an Optical Fiber Amplifier Having Nanostructures, filed Feb. 19, 2010, (Burov et al.); U.S. Patent Application Publication No. US2010/0254653 A1 for a Multimode Fiber, filed Apr. 22, 2010, (Molin et al.); U.S. Patent Application Publication No. US2010/0310218 A1 for a Large Bandwidth Multimode Optical Fiber Having a Reduced Cladding Effect, filed Jun. 4, 2010, (Molin et al.); U.S. Patent Application Publication No. US2011/0058781 A1 for a Multimode Optical Fiber Having Improved Bending Losses, filed Sep. 9, 2010, (Molin et al.); U.S. Patent Application Publication No. US2011/0064367 A1 for a Multimode Optical Fiber, filed Sep. 17, 2010, (Molin et al.); U.S. Patent Application Publication No. US2011/0069724 A1 for an Optical Fiber for Sum-Frequency Generation, filed Sep. 22, 2010, (Richard et al.); U.S. patent application Ser. No. 12/944,422 for a Rare-Earth-Doped Optical Fiber Having Small Numerical Aperture, filed Nov. 11, 2010, (Boivin et al.); U.S. patent application Ser. No. 12/953,948 for a High-Bandwidth, Multimode Optical Fiber with Reduced Cladding Effect, filed Nov. 24, 2010, (Molin et al.); U.S. patent application Ser. No. 12/954,036 for a High-Bandwidth, Dual-Trench-Assisted Multimode Optical Fiber, filed Nov. 24, 2010, (Molin et al.); U.S. patent application Ser. No. 12/959,688 for a Multimode Optical Fiber with Low Bending Losses and Reduced Cladding Effect, filed Dec. 3, 2010, (Molin et al.); U.S. patent application Ser. No. 12/959,866 for a High-Bandwidth Multimode Optical Fiber Having Reduced Bending Losses, filed Dec. 3, 2010, (Molin et al.); U.S. patent application Ser. No. 13/017,089 for a Non-Zero Dispersion Shifted Optical Fiber Having a Large Effective Area, filed Jan. 31, 2011, (Sillard et al.); U.S. patent application Ser. No. 13/017,092 for a Non-Zero Dispersion Shifted Optical Fiber Having a Short Cutoff Wavelength, filed Jan. 31, 2011, (Sillard et al.); U.S. patent application Ser. No. 13/037,943 for a Broad-Bandwidth Multimode Optical Fiber Having Reduced Bending Losses, filed Mar. 1, 2011, (Bigot-Astruc et al.); and U.S. patent application Ser. No. 13/048,028 for a Single-Mode Optical Fiber, filed Mar. 15, 2011, (de Montmorillon et al.).

To supplement the present disclosure, this application further incorporates entirely by reference the following commonly assigned patents, patent application publications, and patent applications: U.S. Pat. No. 5,574,816 for Polypropylene-Polyethylene Copolymer Buffer Tubes for Optical Fiber Cables and Method for Making the Same; U.S. Pat. No. 5,717,805 for Stress Concentrations in an Optical Fiber Ribbon to Facilitate Separation of Ribbon Matrix Material; U.S. Pat. No. 5,761,362 for Polypropylene-Polyethylene Copolymer Buffer Tubes for Optical Fiber Cables and Method for Making the Same; U.S. Pat. No. 5,911,023 for Polyolefin Materials Suitable for Optical Fiber Cable Components; U.S. Pat. No. 5,982,968 for Stress Concentrations in an Optical Fiber Ribbon to Facilitate Separation of Ribbon Matrix Material; U.S. Pat. No. 6,035,087 for an Optical Unit for Fiber Optic Cables; U.S. Pat. No. 6,066,397 for Polypropylene Filler Rods for Optical Fiber Communications Cables; U.S. Pat. No. 6,175,677 for an Optical Fiber Multi-Ribbon and Method for Making the Same; U.S. Pat. No. 6,085,009 for Water Blocking Gels Compatible with Polyolefin Optical Fiber Cable Buffer Tubes and Cables Made Therewith; U.S. Pat. No. 6,215,931 for Flexible Thermoplastic Polyolefin Elastomers for Buffering Transmission Elements in a Telecommunications Cable; U.S. Pat. No. 6,134,363 for a Method for Accessing Optical Fibers in the Midspan Region of an Optical Fiber Cable; U.S. Pat. No. 6,381,390 for a Color-Coded Optical Fiber Ribbon and Die for Making the Same; U.S. Pat. No. 6,181,857 for a Method for Accessing Optical Fibers Contained in a Sheath; U.S. Pat. No. 6,314,224 for a Thick-Walled Cable Jacket with Non-Circular Cavity Cross Section; U.S. Pat. No. 6,334,016 for an Optical Fiber Ribbon Matrix Material Having Optimal Handling Characteristics; U.S. Pat. No. 6,321,012 for an Optical Fiber Having Water Swellable Material for Identifying Grouping of Fiber Groups; U.S. Pat. No. 6,321,014 for a Method for Manufacturing Optical Fiber Ribbon; U.S. Pat. No. 6,210,802 for Polypropylene Filler Rods for Optical Fiber Communications Cables; U.S. Pat. No. 6,493,491 for an Optical Drop Cable for Aerial Installation; U.S. Pat. No. 7,346,244 for a Coated Central Strength Member for Fiber Optic Cables with Reduced Shrinkage; U.S. Pat. No. 6,658,184 for a Protective Skin for Optical Fibers; U.S. Pat. No. 6,603,908 for a Buffer Tube that Results in Easy Access to and Low Attenuation of Fibers Disposed Within Buffer Tube; U.S. Pat. No. 7,045,010 for an Applicator for High-Speed Gel Buffering of Flextube Optical Fiber Bundles; U.S. Pat. No. 6,749,446 for an Optical Fiber Cable with Cushion Members Protecting Optical Fiber Ribbon Stack; U.S. Pat. No. 6,922,515 for a Method and Apparatus to Reduce Variation of Excess Fiber Length in Buffer Tubes of Fiber Optic Cables; U.S. Pat. No. 6,618,538 for a Method and Apparatus to Reduce Variation of Excess Fiber Length in Buffer Tubes of Fiber Optic Cables; U.S. Pat. No. 7,322,122 for a Method and Apparatus for Curing a Fiber Having at Least Two Fiber Coating Curing Stages; U.S. Pat. No. 6,912,347 for an Optimized Fiber Optic Cable Suitable for Microduct Blown Installation; U.S. Pat. No. 6,941,049 for a Fiber Optic Cable Having No Rigid Strength Members and a Reduced Coefficient of Thermal Expansion; U.S. Pat. No. 7,162,128 for Use of Buffer Tube Coupling Coil to Prevent Fiber Retraction; U.S. Pat. No. 7,515,795 for a Water-Swellable Tape, Adhesive-Backed for Coupling When Used Inside a Buffer Tube (Overton et al.); U.S. Patent Application Publication No. 2008/0292262 for a Grease-Free Buffer Optical Fiber Buffer Tube Construction Utilizing a Water-Swellable, Texturized Yarn (Overton et al.); European Patent Application Publication No. 1,921,478 A1, for a Telecommunication Optical Fiber Cable (Tatat et al.); U.S. Pat. No. 7,702,204 for a Method for Manufacturing an Optical Fiber Preform (Gonnet et al.); U.S. Pat. No. 7,570,852 for an Optical Fiber Cable Suited for Blown Installation or Pushing Installation in Microducts of Small Diameter (Nothofer et al.); U.S. Pat. No. 7,646,954 for an Optical Fiber Telecommunications Cable (Tatat); U.S. Pat. No. 7,599,589 for a Gel-Free Buffer Tube with Adhesively Coupled Optical Element (Overton et al.); U.S. Pat. No. 7,567,739 for a Fiber Optic Cable Having a Water-Swellable Element (Overton); U.S. Pat. No. 7,817,891 for a Method for Accessing Optical Fibers within a Telecommunication Cable (Lavenne et al.); U.S. Pat. No. 7,639,915 for an Optical Fiber Cable Having a Deformable Coupling Element (Parris et al.); U.S. Pat. No. 7,646,952 for an Optical Fiber Cable Having Raised Coupling Supports (Parris); U.S. Pat. No. 7,724,998 for a Coupling Composition for Optical Fiber Cables (Parris et al.); U.S. Patent Application Publication No. US2009/0214167 A1 for a Buffer Tube with Hollow Channels, (Lookadoo et al.); U.S. Patent Application Publication No. US2009/0297107 A1 for an Optical Fiber Telecommunication Cable, filed May 15, 2009, (Tatat); U.S. Patent Application Publication No. US2009/0279833 A1 for a Buffer Tube with Adhesively Coupled Optical Fibers and/or Water-Swellable Element, filed Jul. 21, 2009, (Overton et al.); U.S. Patent Application Publication No. US2010/0092135 A1 for an Optical Fiber Cable Assembly, filed Sep. 10, 2009, (Barker et al.); U.S. Patent Application Publication No. US2010/0067857 A1 for a High-Fiber-Density Optical Fiber Cable, filed Sep. 10, 2009, (Lovie et al.); U.S. Patent Application Publication No. US2010/0067855 A1 for a Buffer Tubes for Mid-Span Storage, filed Sep. 11, 2009, (Barker); U.S. Patent Application Publication No. US2010/0135623 A1 for Single-Fiber Drop Cables for MDU Deployments, filed Nov. 9, 2009, (Overton); U.S. Patent Application Publication No. US2010/0092140 A1 for an Optical-Fiber Loose Tube Cables, filed Nov. 9, 2009, (Overton); U.S. Patent Application Publication No. US2010/0135624 A1 for a Reduced-Size Flat Drop Cable, filed Nov. 9, 2009, (Overton et al.); U.S. Patent Application Publication No. US2010/0092138 A1 for ADSS Cables with High-Performance Optical Fiber, filed Nov. 9, 2009, (Overton); U.S. Patent Application Publication No. US2010/0135625 A1 for Reduced-Diameter Ribbon Cables with High-Performance Optical Fiber, filed Nov. 10, 2009, (Overton); U.S. Patent Application Publication No. US2010/0092139 A1 for a Reduced-Diameter, Easy-Access Loose Tube Cable, filed Nov. 10, 2009, (Overton); U.S. Patent Application Publication No. US2010/0154479 A1 for a Method and Device for Manufacturing an Optical Preform, filed Dec. 19, 2009, (Milicevic et al.); U.S. Patent Application Publication No. US 2010/0166375 for a Perforated Water-Blocking Element, filed Dec. 29, 2009, (Parris); U.S. Patent Application Publication No. US2010/0183821 A1 for a UVLED Apparatus for Curing Glass-Fiber Coatings, filed Dec. 30, 2009, (Hartsuiker et al.); U.S. Patent Application Publication No. US2010/0202741 A1 for a Central-Tube Cable with High-Conductivity Conductors Encapsulated with High-Dielectric-Strength Insulation, filed Feb. 4, 2010, (Ryan et al.); U.S. Patent Application Publication No. US2010/0215328 A1 for a Cable Having Lubricated, Extractable Elements, filed Feb. 23, 2010, (Tatat et al.); U.S. Patent Application Publication No. US2011/0026889 A1 for a Tight-Buffered Optical Fiber Unit Having Improved Accessibility, filed Jul. 26, 2010, (Risch et al.); U.S. Patent Application Publication No. US2011/0064371 A1 for Methods and Devices for Cable Insertion into Latched Conduit, filed Sep. 14, 2010, (Leatherman et al.); U.S. Patent Publication No. 2011/0069932 A1 for a High-Fiber-Density Optical-Fiber Cable, filed Oct. 19, 2010, (Overton et al.); U.S. Patent Publication No. 2011/0091171 A1 for an Optical-Fiber Cable Having High Fiber Count and High Fiber Density, filed Oct.

19, 2010, (Tatat et al.); U.S. patent application Ser. No. 13/009,118 for a Water-Soluble Water-Blocking Element, filed Jan. 19, 2011, (Parris); U.S. patent application Ser. No. 13/096,178 for a Data-Center Cable, filed Apr. 28, 2011, (Lovie et al.); and U.S. patent application Ser. No. 13/099,663 for a Bundled Fiber Optic Cables, filed May 3, 2011, (Quinn et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A method for curing a coating on a glass fiber, comprising:
providing a substantially closed, substantially cylindrical cavity having a substantially elliptical cross-section and a reflective inner surface, the cavity defining (i) a first line focus, (ii) a second line focus defining a curing axis, and (iii) a major axis intersecting the first and second line foci;
providing a protective tube that is substantially transparent to ultraviolet (UV) radiation, the protective tube surrounding the curing axis;
passing a glass fiber having an incompletely cured coating through the cylindrical cavity, through the protective tube, and along the second line focus; and
directing UV radiation in a substantially Lambertian emission pattern from the first line focus at an emission angle α between the line of average UV-radiation emission $L_{avg}$ and the cavity's major axis,
wherein the emission angle α is defined by the following equation:

$$\alpha \geq \theta_{source}/2 + \arctan(r_{tube}/(2f)),$$

where
$r_{tube}$ is the radius of the protective tube,
2f is the distance between the first line focus and the second line focus, and
$\theta_{source}$ is the angle of the emittance cone that contains 95 percent of the power directed from the first line focus.

2. The method according to claim 1, comprising reflecting at least a portion of the UV radiation off the cavity's reflective inner surface toward the glass fiber.

3. The method according to claim 2, wherein the reflecting step effects absorption of UV radiation by the glass fiber's incompletely cured coating to promote curing.

4. The method according to claim 1, wherein the step of directing UV radiation comprises emitting UV radiation from a ultraviolet light emitting diode (UVLED) source.

5. The method according to claim 4, wherein the step of emitting UV radiation from a UVLED source comprises emitting UV radiation from a UVLED source that is positioned at the first line focus.

6. The method according to claim 4, wherein the step of emitting UV radiation from a UVLED source comprises emitting at least 80 percent of the UV radiation at wavelengths within a 50-nanometer range.

7. The method according to claim 1, wherein the step of directing UV radiation comprises directing UV radiation from the first line focus at an emission angle α of between about 30 degrees and 60 degrees.

8. A method for curing a coating on a glass fiber, comprising:
providing a substantially closed, substantially cylindrical cavity having a substantially elliptical cross-section and a reflective inner surface, the cavity defining (i) a first line focus, (ii) a second line focus defining a curing axis, and (iii) a major axis intersecting the first and second line foci;
providing a protective tube that is substantially transparent to ultraviolet (UV) radiation, the protective tube surrounding the curing axis;
passing a glass fiber having an incompletely cured coating through the cylindrical cavity, through the protective tube, and along the second line focus;
emitting UV radiation in a substantially Lambertian emission pattern from a UVLED source positioned at the first line focus at an emission angle α between the line of average UV-radiation emission $L_{avg}$ and the cavity's major axis,
wherein the emission angle α is defined by the following equations:

$$\alpha \geq \theta_{source}/2 + \arctan(r_{tube}/(2f)), \text{ and}$$

$$\alpha \leq 2\pi - (\theta_{source}/2 + \arctan(r_{tube}/(2f))),$$

where
$r_{tube}$ is the radius of the protective tube,
2f is the distance between the first line focus and the second line focus, and
$\theta_{source}$ is the angle of the emittance cone of the UVLED source that contains 95 percent of the emitted power from the UVLED source; and
reflecting at least a portion of the UV radiation off the cavity's reflective inner surface toward the glass fiber to effect absorption of UV radiation by the glass fiber's incompletely cured coating in order to promote curing.

9. The method according to claim 8, wherein the step of emitting UV radiation from a UVLED source comprises emitting UV radiation from a single UVLED.

10. The method according to claim 8, wherein the step of emitting UV radiation from a UVLED source comprises emitting UV radiation from a plurality of UVLEDs.

11. The method according to claim 8, wherein the step of emitting UV radiation from a UVLED source comprises emitting at least 90 percent of the UV radiation at wavelengths of between about 250 nanometers and 400 nanometers.

12. The method according to claim 8, wherein the step of emitting UV radiation from a UVLED source comprises emitting at least 80 percent of the UV radiation at wavelengths of between about 375 nanometers and 425 nanometers.

13. The method according to claim 8, wherein the step of emitting UV radiation from a UVLED source comprises emitting at least 80 percent of the UV radiation at wavelengths within a 30-nanometer range.

14. The method according to claim 8, wherein the step of emitting UV radiation from a UVLED source comprises emitting UV radiation at an emission angle α of between about 40 degrees and 50 degrees.

15. A method for curing a coating on a glass fiber, comprising:
providing a substantially closed, substantially cylindrical cavity having a substantially elliptical cross-section and a reflective inner surface, the cavity defining (i) a first line focus, (ii) a second line focus defining a curing axis, and (iii) a major axis intersecting the first and second line foci;

providing a protective tube that is substantially transparent to ultraviolet (UV) radiation, the protective tube surrounding the curing axis;

passing a glass fiber having an incompletely cured coating through the cylindrical cavity, through the protective tube, and along the curing axis; and emitting UV radiation in a substantially Lambertian emission pattern from a UVLED source positioned within the cavity at the first line focus at an emission angle α between the line of average UV-radiation emission $L_{avg}$ and the cavity's major axis, wherein the emission angle α is defined by the following equation:

$$\alpha \geq \theta_{source}/2 + \arctan(r_{tube}/(2f)),$$

where $r_{tube}$ is the radius of the protective tube, 2f is the distance between the first line focus and the second line focus, and $\theta_{source}$ is the angle of the emittance cone of the UVLED source that contains 95 percent of the emitted power from the UVLED source.

16. The method according to claim 15, comprising reflecting at least a portion of the UV radiation off the cavity's reflective inner surface toward the glass fiber to effect absorption of UV radiation by the glass fiber's incompletely cured coating in order to promote curing.

17. The method according to claim 15, wherein the step of emitting UV radiation from a UVLED source comprises emitting UV radiation from at least two UVLEDs that emit UV radiation at different output intensities.

18. The method according to claim 15, wherein the step of emitting UV radiation from a UVLED source comprises emitting at least 90 percent of the UV radiation at wavelengths of between about 300 nanometers and 450 nanometers.

19. The method according to claim 15, wherein the step of emitting UV radiation from a UVLED source comprises emitting at least 80 percent of the UV radiation at wavelengths within a 50-nanometer range.

20. The method according to claim 15, wherein the step of emitting UV radiation from a UVLED source comprises emitting UV radiation from a UVLED source positioned within the cavity at the first line focus at an emission angle α of between about 30 degrees and 100 degrees.

21. The method according to claim 15, wherein the step of emitting UV radiation from a UVLED source comprises emitting UV radiation from a UVLED source positioned within the cavity at the first line focus at an emission angle α of between about 45 degrees and 90 degrees.

22. The method according to claim 15, wherein the step of emitting UV radiation from a UVLED source comprises emitting UV radiation from a UVLED source positioned within the cavity at the first line focus at an emission angle α of between about 40 degrees and 50 degrees.

23. The method according to claim 15, wherein the protective tube is a quartz tube that is substantially transparent to UV radiation.

* * * * *